(12) United States Patent
Guo

(10) Patent No.: US 10,932,137 B2
(45) Date of Patent: Feb. 23, 2021

(54) NETWORK MANAGEMENT APPARATUS, METHOD AND APPARATUS IN WIRELESS COMMUNICATION SYSTEM

(71) Applicant: SONY CORPORATION, Tokyo (JP)

(72) Inventor: Xin Guo, Beijing (CN)

(73) Assignee: SONY CORPORATION, Tokyo (JP)

( * ) Notice: Subject to any disclaimer, the term of this patent is extended or adjusted under 35 U.S.C. 154(b) by 40 days.

(21) Appl. No.: 14/782,724

(22) PCT Filed: Apr. 25, 2014

(86) PCT No.: PCT/CN2014/076183
§ 371 (c)(1),
(2) Date: Oct. 6, 2015

(87) PCT Pub. No.: WO2014/180261
PCT Pub. Date: Nov. 13, 2014

(65) Prior Publication Data
US 2016/0057630 A1 Feb. 25, 2016

(30) Foreign Application Priority Data

May 8, 2013 (CN) .......................... 201310166123.8

(51) Int. Cl.
*H04W 64/00* (2009.01)
*H04W 16/02* (2009.01)
(Continued)

(52) U.S. Cl.
CPC .............. *H04W 16/12* (2013.01); *H04B 7/15* (2013.01); *H04W 4/021* (2013.01); *H04W 4/06* (2013.01); *H04W 16/10* (2013.01); *H04W 24/02* (2013.01)

(58) Field of Classification Search
CPC ...... H04W 16/10; H04W 4/021; H04W 8/005
(Continued)

(56) References Cited

U.S. PATENT DOCUMENTS

2002/0058535 A1\* 5/2002 Lee .......................... H01Q 1/246
455/562.1
2002/0082003 A1\* 6/2002 Chervatin ............. H04W 16/02
455/447
(Continued)

FOREIGN PATENT DOCUMENTS

CN 101355473 A 1/2009
CN 101860786 A 10/2010
(Continued)

OTHER PUBLICATIONS

International Search Report dated Aug. 6, 2014, in PCT/CN2014/076183 filed Apr. 25, 2014.

*Primary Examiner* — Asad M Nawaz
*Assistant Examiner* — Jason A Harley
(74) *Attorney, Agent, or Firm* — Xsensus LLP

(57) ABSTRACT

A network management apparatus, a method and an apparatus in a wireless communication system. The network management apparatus includes: a network area dividing unit, configured to divide the coverage area of network signals into multiple sub-areas according to the transmission characteristics of a network node; a network node locating unit, configured to determine the sub-area in which the network node locates in the coverage area of network signals according to the geographical location information of the network node; and a wireless network resource management unit, configured to construct wireless network resource management information according to the sub-area in which the network node locates. According to embodiments, rapid dynamic network programming and reasonable wireless network resource allocation can be realized.

31 Claims, 20 Drawing Sheets dividing method in rectangular coordinate system

(51) Int. Cl.
  *H04W 72/04*  (2009.01)
  *H04W 4/02*  (2018.01)
  *H04W 16/12*  (2009.01)
  *H04W 16/10*  (2009.01)
  *H04B 7/15*  (2006.01)
  *H04W 4/021*  (2018.01)
  *H04W 4/06*  (2009.01)
  *H04W 24/02*  (2009.01)

(58) Field of Classification Search
  USPC .......................................................... 370/254
  See application file for complete search history.

(56) References Cited

U.S. PATENT DOCUMENTS

| | | | | |
|---|---|---|---|---|
| 2006/0083205 | A1* | 4/2006 | Buddhikot | H04W 16/14 370/338 |
| 2006/0140217 | A1* | 6/2006 | Jung | H04L 27/2601 370/468 |
| 2007/0019646 | A1* | 1/2007 | Bryant | H04L 12/1868 370/390 |
| 2008/0298250 | A1* | 12/2008 | Larsson | H04L 45/123 370/238 |
| 2012/0020222 | A1* | 1/2012 | Nishioka | H04W 40/12 370/235 |
| 2012/0196624 | A1* | 8/2012 | Han | H04W 64/00 455/456.3 |
| 2012/0320768 | A1* | 12/2012 | Shaffer | H04W 40/16 370/252 |
| 2013/0065613 | A1* | 3/2013 | Stopel | H04W 4/18 455/456.3 |
| 2013/0343346 | A1 | 12/2013 | Chen et al. | |
| 2014/0031058 | A1* | 1/2014 | Zhang | H04L 43/045 455/456.1 |
| 2014/0192735 | A1* | 7/2014 | Sridharan | H04L 61/2038 370/329 |
| 2014/0256334 | A1* | 9/2014 | Kazmi | H04W 28/18 455/450 |

FOREIGN PATENT DOCUMENTS

| | | |
|---|---|---|
| CN | 102651910 A | 8/2012 |
| CN | 102740392 A | 10/2012 |
| JP | 2009-055083 A | 3/2009 |

* cited by examiner dividing method in rectangular
coordinate system

Dividing method in polar
coordinate system

NETWORK MANAGEMENT APPARATUS, METHOD AND APPARATUS IN WIRELESS COMMUNICATION SYSTEM

FIELD OF THE INVENTION

The present disclosure generally relates to the field of wireless communication, and more particularly, to a network management apparatus, method and apparatus in a wireless communication system capable of efficiently achieving dynamic network programming and wireless network resource allocation.

BACKGROUND OF THE INVENTION

With the rapid development of computer and communication technology, global information network is quickly evolving towards Internet Protocol (IP) based Network Generation Network (NGN). An important feature of the Next Generation Network is a heterogeneous radio access network formed by coexistence of a plurality of wireless communication technologies. The heterogeneous radio access network has abundant connotations in terms of wireless technologies, coverage, network architectures, network performance and the like. From the view of the coverage, the wireless network can be classified as Wide Area Network (WAN), Metropolitan Area Network (MAN), Local Area Network (LAN), Personal Area Network (PAN) and the like. From the view of the network architectures, the wireless network can be classified as Single-hop Network of Point-to-Multipoint (PMP), Multi-hop Network, Mesh Network, Ad hoc and the like. These wireless networks form stereoscopic coverage in geographic distribution so as to provide users with wireless multimedia services with abundant contents together everywhere.

However, the heterogeneous network increases network coverage density and network layout complexity, thereby aggravating confliction between user's bandwidth requirements and scarcity of wireless resources. In order to increase network system capacity, it needs support of technologies of finer resource management, dynamic network programming, user mobility management and the like, while implementation of these technologies depends on effective grasp of distribution information of network nodes.

SUMMARY OF THE INVENTION

A brief summary of the disclosure will be given below to provide basic understanding of some aspects of the disclosure. However, it shall be appreciated that this summary is neither exhaustively descriptive of the disclosure nor intended to define essential or important components or the scope of the disclosure but is merely for the purpose of presenting some concepts of the disclosure in a simplified form and hereby acts as a preamble of more detailed descriptions which will be presented later.

Thus, in view of the above circumstances, an object of the present disclosure is to provide a network management apparatus, method and apparatus in a wireless communication system capable of efficiently achieving network node distribution management. According to embodiments of the disclosure, it is possible to significantly reduce amount of processing by dividing network signal coverage into a plurality of sub-regions and performing the network node distribution management in a unit of sub-region, thereby providing basis for quick decision of the dynamic network programming, fine network resource allocation and resource allocation for mobile network nodes.

According to an aspect of the disclosure, there is provided a network management apparatus in a wireless communication system, the apparatus including: a network region dividing unit configured to divide a network signal coverage into a plurality of sub-regions according to transmission characteristics of a network node; a network node locating unit configured to determine a sub-region in which the network node locates within the network signal coverage according to geographic position information of the network node; and a wireless network resource managing unit configured to construct wireless network resource management information according to the sub-region in which the network node locates.

According to a preferred embodiment of the disclosure, the network management apparatus may further include: a neighbor node determining unit configured to determine a neighbor node being capable of directly communicating with the network node according to the transmission characteristics of the network node. Preferably, the wireless network resource managing unit may be further configured to construct the wireless network resource management information based on the determined neighbor node.

According to another preferred embodiment of the disclosure, the wireless network resource managing unit may further include: a network connectivity managing module configured to manage a connected network formed by each network node and its neighbor node, wherein any two network nodes within the connected network are able to communicate with each other via at least one wireless path constituted by one or more wireless links.

According to another preferred embodiment of the disclosure, the network connectivity managing module may be further configured to manage a connected sub-region network which is formed by sub-regions in which each of the network nodes within the connected network locates and which corresponds to the connected network.

According to another preferred embodiment of the disclosure, the network connectivity managing module may further include: a connected network establishing component configured to establish the connected network and the connected sub-region network according to the determined neighbor node; and a connected network updating component configured to update the established connected network and connected sub-region network according to status and/or motion feature of the network node.

According to another preferred embodiment of the disclosure, the connected network establishing component may be further configured to: establish, for any target network node, the connected network formed by all of relevant network nodes related to the target network node and the target network node based on the relevant network nodes, in which the relevant network nodes include a neighbor node of the target network node and a network node which is able to communicate with the target network node via the neighbor node; and establish the connected sub-region network corresponding to the connected network according to a sub-region in which the target network node locates and sub-regions in which the relevant network nodes locate.

According to another preferred embodiment of the disclosure, the connected network updating component may be further configured to update, when the status and/or motion feature of the network node changes, the established connected network and connected sub-region network according to variations in the connected network and the connected sub-region network in which the network node is involved.

According to another preferred embodiment of the disclosure, the wireless network resource managing unit may further include: a network interference control and managing module configured to estimate an interference range of wireless network resources used in communication between each network node and its neighbor node and manage wireless network resources available to each network node according to the estimated interference range.

According to another preferred embodiment of the disclosure, the network interference control and managing module may be further configured to manage wireless network resources available to the sub-region in which each network node locates according to the estimated interference range.

According to another preferred embodiment of the disclosure, the network interference control and managing module may be further configured to establish a distribution map of available wireless network resources for each sub-region according to the wireless network resources available to each sub-region.

According to another preferred embodiment of the disclosure, the network interference control and managing module may be further configured to re-determine the interference range when the status and/or motion feature of the network node changes, and to update the distribution map of available wireless network resources according to the re-determined interference range.

According to another preferred embodiment of the disclosure, the network region dividing unit may be further configured to determine a size of the sub-region according to an object of network region division.

According to another preferred embodiment of the disclosure, the network management apparatus may further include a motion feature estimating unit configured to estimate a motion feature of the network node in a unit of sub-region, in which the wireless network resource managing unit may be further configured to construct the wireless network resource management information based on the motion feature.

According to another preferred embodiment of the disclosure, the network node locating unit may be further configured to determine a series of sub-regions that the network node passes through within a predetermined time period and a time during which the network node resides in each sub-region according to the motion feature of the network node, thereby obtaining a locating result of the network node.

According to another preferred embodiment of the disclosure, the wireless network resource managing unit may be further configured to group the network node according to the locating result and the motion feature of the network node and construct the wireless network resource management information according to the grouped network node.

According to another aspect of the disclosure, there is also provided a method for use in a wireless communication system, the method including: a network region dividing step of dividing a network signal coverage into a plurality of sub-regions according to transmission characteristics of a network node; a network node locating step of determining a sub-region in which the network node locates within the network signal coverage according to geographic position information of the network node; and a wireless network resource managing step of constructing wireless network resource management information according to the sub-region in which the network node locates.

According to another aspect of the disclosure, there is also provided an apparatus in a wireless communication system, the apparatus including: an information acquiring unit configured to acquire wireless network resource management information provided by the network management apparatus according to an embodiment of the disclosure; and a network programming unit configured to perform network programming according to the wireless network resource management information.

According to a preferred embodiment of the disclosure, the apparatus may further include: a wireless network resource allocating unit configured to allocate wireless network resources according to the wireless network resource management information provided by the network management apparatus.

According to another preferred embodiment of the disclosure, the apparatus may further include a locating unit configured to acquire geographic position information of a network node.

According to another preferred embodiment of the disclosure, the network programming unit may be further configured to check, upon receipt of a communication request initiated by a network node, destination node information contained in the communication request, and to instruct, if a destination node indicated by the destination node information is judged to be a neighbor node of the network node according to neighbor node information contained in the wireless network resource management information, the network node to establish a Device to Device connection with the destination node so as to perform communication.

According to another preferred embodiment of the disclosure, if the communication request does not specify the destination node, the network programming unit may be further configured to quickly find a network node serving as a Device to Device interconnection object for the network node from a set of neighbor nodes of the network node according to the neighbor node information, and to instruct the network node to establish Device to Device connection with the found network node serving as the Device to Device interconnection object so as to perform communication.

According to another preferred embodiment of the disclosure, the network programming unit may be further configured to check, upon receipt of a communication request initiated by a network node, whether the communication request allows relay via other network nodes, and to find, if the relay via other network nodes is allowed, a network node serving as a relay node of the network node from a set of neighbor nodes of the network node according to neighbor node information contained in the wireless network resource management information, and to instruct the network node to establish connection with the found network node as the relay node so as to perform communication.

According to another preferred embodiment of the disclosure, the network programming unit may be further configured to check, upon receipt of communication requests initiated by a plurality of network nodes, destination node information contained in the communication requests, and to instruct, if all of destination nodes contained in the communication requests of the plurality of network nodes and the plurality network nodes are judged to be neighbor nodes of a certain network node according to neighbor node information contained in the wireless network resource management information, the certain network node to establish a Point-to-Multipoint connection with the plurality of network nodes and the corresponding destination nodes so as to perform communication.

According to another preferred embodiment of the disclosure, the network programming unit may be further configured to check, upon receipt of a communication request initiated by a network node, destination node information contained in the communication request, and to notify, if a destination node indicated by the destination node information and the network node are judged to belong to the same connected network according to connected network information contained in the wireless network resource management information, the network node of being able to communicate with the destination node.

According to another preferred embodiment of the disclosure, if the destination node and the network node belong to the same connected network, the network programming unit may be further configured to select, based on sub-regions in which the destination node and the network node locate, a route for communication between the destination node and the network node according to connected sub-region network information contained in the wireless network resource management information, and to instruct the network node to communicate with the destination node via the selected route.

According to another preferred embodiment of the disclosure, the wireless network resource allocating unit may be further configured to check, upon receipt of a communication request initiated by a network node, destination node information contained in the communication request, and to allocate, based on sub-regions in which a destination node indicated by the destination node information and the network node locate, the wireless network resources for communication between the network node and the destination node according to the wireless network resource management information.

According to another aspect of the disclosure, there is also provided an apparatus in a wireless communication system, the apparatus including: a sub-region information receiving unit configured to receive information about a sub-region in which the apparatus locates from the network management apparatus according to an embodiment of the disclosure; and a notifying unit configured to notify the network management apparatus when the apparatus is judged to be leaving or have left the sub-region according to geographic position information of the apparatus.

According to a preferred embodiment of the disclosure, the apparatus may further include a locating unit configured to measure the geographic position information. Preferably, the notifying unit may be further configured to notify the network management apparatus of the geographic position information.

According to another aspect of the disclosure, there is also provided a storage medium including machine-readable program codes, which when executed on an information processing device, cause the information processing device to execute the following steps: a network region dividing step of dividing a network signal coverage into a plurality of sub-regions according to transmission characteristics of a network node; a network node locating step of determining a sub-region in which the network node locates within the network signal coverage according to geographic position information of the network node; and a wireless network resource managing step of constructing wireless network resource management information according to the sub-region in which the network node locates.

According to another aspect of the disclosure, there is also provided a program product including machine executable instructions, which when executed on an information processing device, cause the information processing device to execute the following steps: a network region dividing step of dividing a network signal coverage into a plurality of sub-regions according to transmission characteristics of a network node; a network node locating step of determining a sub-region in which the network node locates within the network signal coverage according to geographic position information of the network node; and a wireless network resource managing step of constructing wireless network resource management information according to the sub-region in which the network node locates.

According to the embodiments of the disclosure, it facilitates quick dynamic network programming and reasonable wireless network resource allocation by dividing the network signal coverage into a plurality of sub-regions and managing the wireless network node distribution in a unit of sub-region, thereby enabling the user's bandwidth requirements to be satisfied better with limited wireless network resources.

Other aspects of the embodiments of the disclosure will be presented in the following detailed description serving to fully disclose preferred embodiments of the disclosure but not to limit the disclosure.

BRIEF DESCRIPTION OF THE DRAWINGS

The disclosure can be better understood with reference to the detailed description given below in conjunction with the accompanying drawings, throughout which identical or like reference signs denote identical or like components. The accompanying drawings together with the following detailed description are incorporated into and form a part of the specification and serve to further illustrate the preferred embodiments of the disclosure and to explain the principle and advantages of the disclosure by way of example. In the drawings.

DETAILED DESCRIPTION OF THE INVENTION

Figure 1:
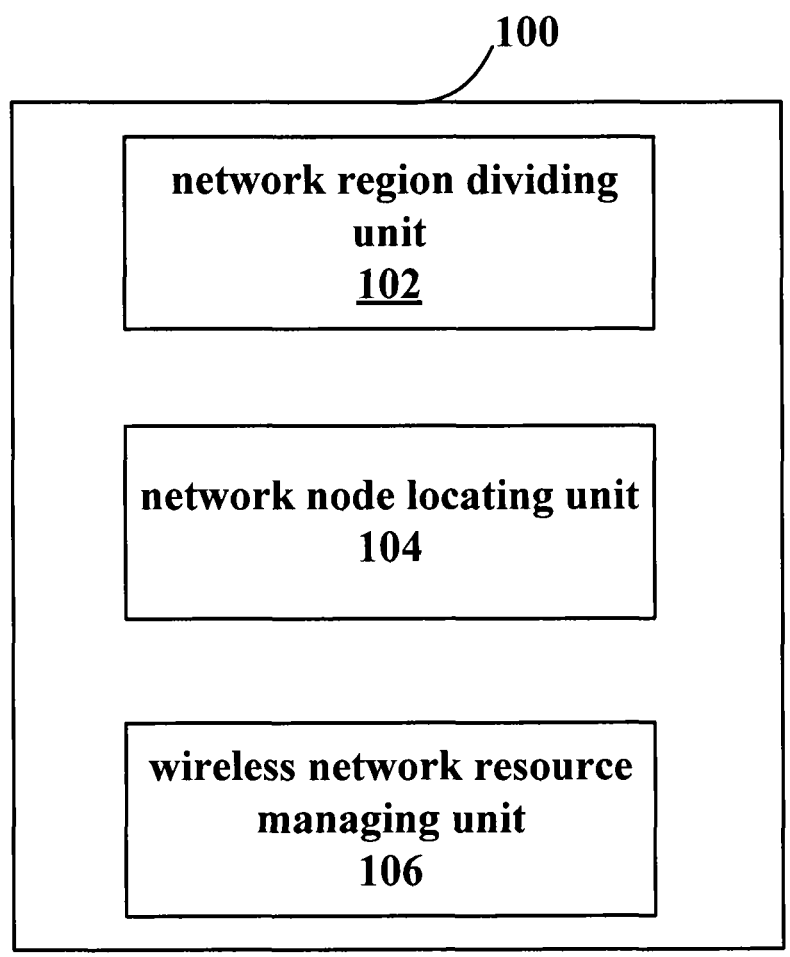
FIG. 1 is a block diagram illustrating an example of functional configuration of a network managing apparatus in a wireless communication system according to an embodiment of the disclosure.

Exemplary embodiments of the present disclosure will be described below in conjunction with the accompanying drawings. For the sake of clarity and conciseness, not all the features of practical implementations are described in the specification. However, it is to be appreciated that numerous implementation-specific decisions shall be made during developing any of such practical implementations so as to achieve the developer's specific goals, for example, to comply with system- and business-related constraining conditions which will vary from one implementation to another. Moreover, it shall also be appreciated that such a development effort might be very complex and time-consuming but may simply be a routine task for those skilled in the art benefiting from this disclosure.

It shall further be noted that only those device structures and/or process steps closely relevant to the solutions of the disclosure are illustrated in the drawings while other details less relevant to the disclosure are omitted so as not to obscure the disclosure due to those unnecessary details.

First, an example of functional configuration of a network managing apparatus in a wireless communication system according to an embodiment of the disclosure will be described with reference to FIG. 1 below. FIG. 1 is a block diagram illustrating an example of functional configuration of a network managing apparatus in a wireless communication system according to an embodiment of the disclosure.

As shown in FIG. 1, the network managing apparatus 100 in the wireless communication system may include a network region dividing unit 102, a network node locating unit 104 and a wireless network resource managing unit 106.

As described above, fine wireless resource management and dynamic network programming need to know positions at which the network nodes in the wireless network are located, thereby providing channel and link resources and determining transformation of network structures according to the positions of the network nodes. However, in a case that the number of the network nodes is great, and especially, in a case that the network node has mobility at high speed, a traditional method of performing wireless network management in a unit of node has low efficiency. Therefore, an effective method is to divide the network signal coverage into a plurality of sub-regions, each of which may include one or more network nodes, according to an object of network region division, and to perform wireless network management in a unit of sub-region. However, it should be understood that in addition to performing the wireless network management in a unit of sub-region, it may be also possible to perform the wireless network management in a hierarchical manner as required, for example, the wireless network management is performed with two or more sub-regions as a basic unit, and the disclosure makes no limitation on this. Hereinafter, in order to facilitate explanation, the principle of the disclosure is described using a case of managing the wireless network resources based on the divided unit sub-region as an example, but this constructs no limitation on the disclosure.

The network region dividing unit 102 may be configured to divide the network signal coverage into a plurality of sub-regions according to transmission characteristics of the network node.

In dividing the sub-regions, a core problem is to determine a shape, size and characterizing method of the sub-region. It is to be understood that the shape of the sub-region can be any shape. However, in order to facilitate management, an effective method is to first divide the network signal coverage in a regular unit shape and then combine the plurality of unit shapes as required. Hereinafter, in order to facilitate description, as an example, the embodiments of the invention are described with the determined unit shape as the sub-region.

Further, preferably, the network region dividing unit 102 may be further configured to determine a size of the sub-region based on an object of network region division.

Figure 2A:
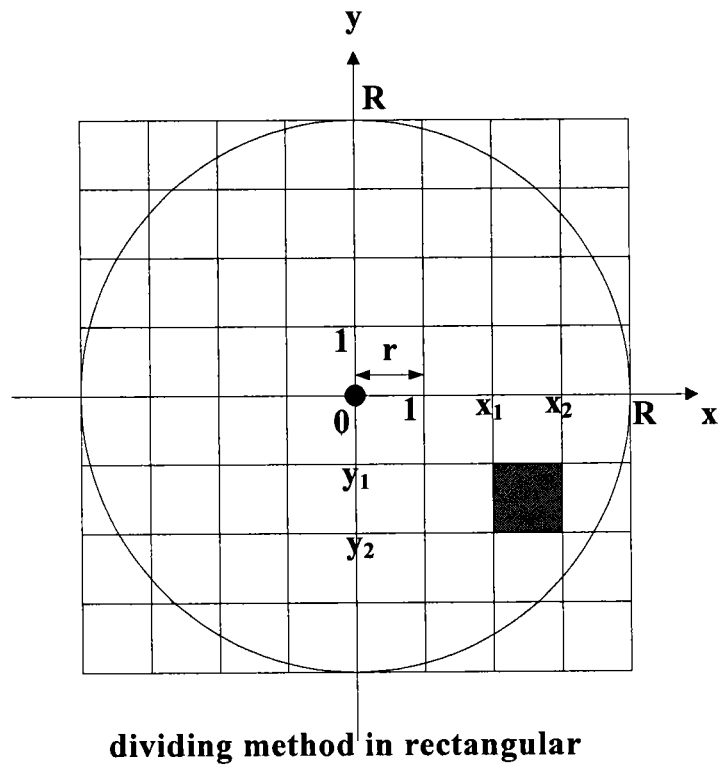
FIG. 2A and FIG. 2B are schematic diagrams illustrating examples of manners of dividing the network signal coverage into a plurality of sub-regions.
Figure 2B:
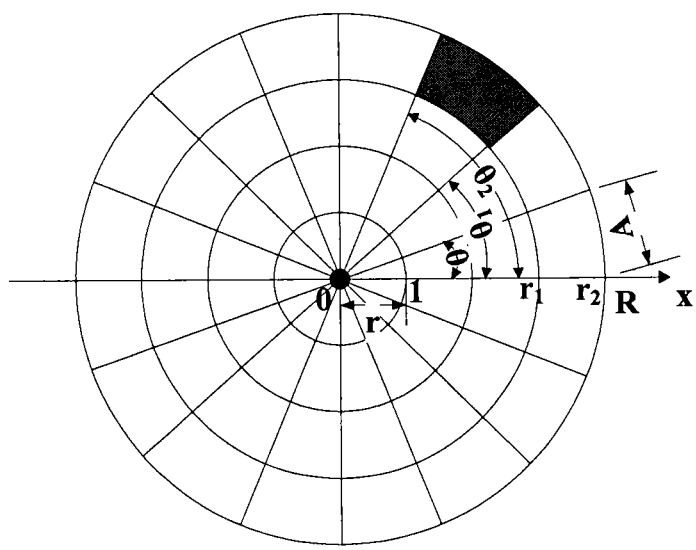

Examples of manners for dividing the network signal coverage into a plurality of sub-regions according to the object of the network region division will be described with reference to FIGS. 2A and 2B below. FIG. 2A and FIG. 2B are schematic diagrams illustrating an example of a manner for dividing the network signal coverage into a plurality of sub-regions.

FIG. 2A illustrates a dividing method in a rectangular coordinate system. Specifically, the rectangular coordinate system is established with for example a base station as an origin O and with a length of r as a unit length, then a unit grid with a side length of r forms a sub-region, whereby a cell served by the base station and having a radius of R (that is, a network signal coverage of the base station) is divided. Preferably, the unit length r can be set according to the object of the network region division. As an example, manners of how to set a size of the sub-region in circumstances of three different objects of the network region division are given below.

a) Circumstance 1: the object is that at most one network node is included within each sub-region. In this case, it can be understood that a diameter d (which is defined as a distance between two points which are farthest from each other in the sub-region, it should be understood that since the example of the sub-region is a square herein, its diameter is equivalent to a length of a diagonal of the square, that is, d=√2 r, hereinafter, the diameter and the diagonal of the square will not be distinguished from each other) of the sub-region can not exceed a minimum distance $D_{min}$ among the network nodes, then the unit length r is set as $r \leq D_{min}/\sqrt{2}$. The minimum distance $D_{min}$ among the network nodes is a basic network parameter which varies according to different wireless networks, for example, the minimum distance $D_{min}$ among the network nodes is specified as 35m in LTE standard TR36.814.

b) Circumstance 2: the object is to estimate connectivity among the network nodes. In this case, it should be understood that in order to ensure the network nodes at both ends of any one wireless link belong to different sub-regions respectively, the diameter of the sub-region is set as d=√2 r not exceeding a minimum signal transmission radius $r_{min}$ between the network nodes, that is, $r \leq r_{min}/\sqrt{2}$. Typically, this object needs to be satisfied in circumstances of Mesh, Ad hoc, Relay network and Device to Device in LTE; and c) Circumstance 3: the object is to ensure one wireless link spans two sub-regions at most. In this case, it should be understood that the unit length r of the sub-region should be set to be no smaller than a maximum signal transmission radius $r_{max}$ of the network node, that is, $r \geq r_{max}$.

Although examples of manners of setting the size of the sub-region in the above three exemplary circumstances have been given, it should understand that those skilled in the art may also appropriately set the size of the sub-region according to other objects of the network region division, or the above multiple objects need to be satisfied at the same time in some cases.

In the case of using the rectangular coordinate system, each sub-region may be characterized by a quadruple formed by boundaries of rectangular coordinate distribution thereof. For example, for a shadow grid as shown in FIG. 2A, it may be characterized by $\{x_1, x_2, y_1, y_2\}$.

FIG. 2B illustrates a dividing method in a polar coordinate system. Specifically, the polar coordinate system is established with for example the base station as the origin O and by leading a polar axis Ox, a length r being a unit polar radius, an angle θ being a unit polar angle, and the sub-region is formed by each arc and the polar radius as shown in FIG. 2B, whereby the cell served by the base station and having a radius of R is divided. It should note that although the shapes of the sub-regions in the polar coordinate system are not completely uniform as shown in the Figure, since an area of the sub-region is much smaller than that of the entire network signal coverage, the calculation can be simplified by adopting some approximation relationships. When setting the size of the sub-region, a sub-region with the largest area is considered, and this sub-region can be approximated to be a square since this sub-region is relatively small as compared with the entire network signal coverage. Side lengths of the square are the polar radius r and an arc length A on the cell edge respectively, and there is an approximation relationship A≈Rθ since the polar angle θ is relatively small, in which 0≤θ≤2π.

According to the above approximation relationships, similar to the dividing method in the rectangular coordinate system as described above with reference to FIG. 2A, the unit polar radius r and the unit polar angle θ are set according to the object of the network region division. For example, in the case that the object is each sub-region includes one network node at most, the diameter d of the sub-region can not exceed the minimum distance $D_{min}$ among the network nodes, and since there is the approximation relationship d≈√2 r and d≈√2 Rθ, it can be obtained that $r \leq D_{min}/\sqrt{2}$ and $\theta \leq D_{min}/\sqrt{2} R$. Other cases are similar to those of FIG. 2A, and no repeated description will be made herein.

In the case of adopting the polar coordinate system, each sub-region can similarly be characterized by a quadruple formed by boundaries of polar coordinate distribution thereof. For example, for a shadow region as shown in FIG. 2B, it can be characterized by the quadruple $\{r_1, r_2, \theta_1, \theta_2\}$.

It should note that in the above description, as an example, considering actual network distribution characteristics and the characteristics that the position of the base station is relatively stationary, the coordinate system is established with the serving base station in the cell as the origin. However, it should understand that the coordinate system can also be established with other appropriate locations in the cell as the origin of course, for example, in a wireless network without a base station (e.g., Ad hoc). Further, it should be understood that although a plurality of local coordinate systems are established with the serving base station in each of the cells as origins so as to divide and characterize the sub-regions in the above, it is to be understood that the coordinate system can also be established with a plurality of cells as one management unit so as to divide the total network signal coverage of the plurality of cells. Alternatively, it is also possible to select an appropriate place in a global network formed by all the cells as the origin to establish a global coordinate system, and to divide the signal coverage of the global network into a plurality of sub-regions and characterize the sub-regions in this global coordinate system, and the present invention makes no limitation on this.

Returning back to FIG. 1, the network node locating unit 104 may be configured to determine a sub-region in which the network node locates within the network signal coverage according to geographic position information of the network node.

The geographic position information of the network node includes values of longitude and latitude of the geographic position of the network node, which values can be obtained by measurement using Global Positioning System (GPS), or can also be obtained by network measurement (e.g., triangular measurement). Then, the network node locating unit 104 can map, according to the obtained values of the longitude and latitude of the network node and in combination with values of longitude and latitude of the origin (e.g., the base station) of the established coordinate system as described above and the establishing manner of the coordinate system, the coordinates of the geographic position (that is, the values of the longitude and latitude) into the coordinates in the established coordinate system, for example, $(x_i, y_i)$ or $(r_i, \theta_i)$, and determine the sub-region in which the network node locates according to a range section of the sub-region in which the coordinates locate.

The wireless network resource managing unit 106 may be configured to construct wireless network resource management information according to the sub-region in which the network node locates. In this way, it is possible to reduce amount of processing, which facilitates for example quick decision of dynamic network programming and wireless network resource allocation.

Figure 3:
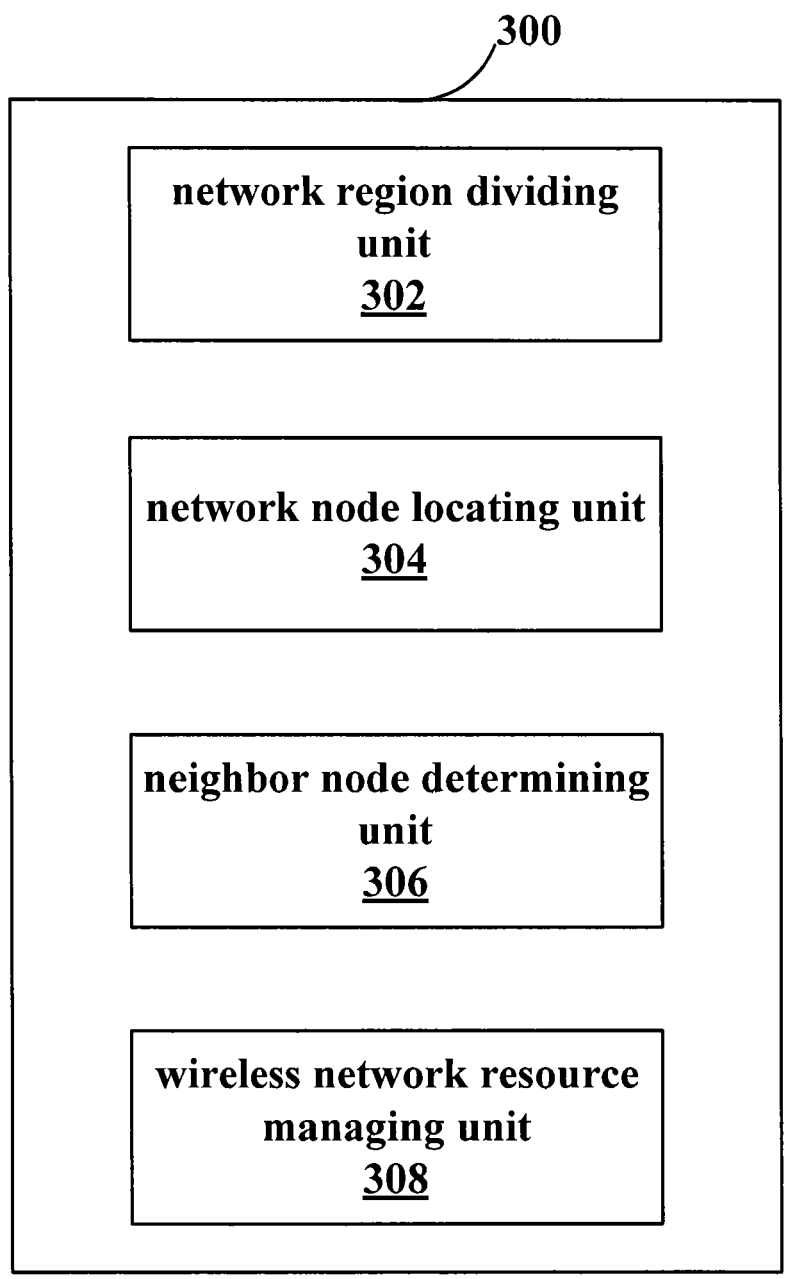
FIG. 3 is a block diagram illustrating an example of functional configuration of a network managing apparatus in a wireless communication system according to another embodiment of the disclosure.

An example of functional configuration of a network management apparatus in a wireless communication system according to another embodiment of the disclosure will be described with reference to FIG. 3 below. FIG. 3 is a block diagram illustrating an example of functional configuration of a network management apparatus in a wireless communication system according to another embodiment of the disclosure.

As shown in FIG. 3, the network management apparatus 300 in the wireless communication system according to the present embodiment may include a network region dividing unit 302, a network node locating unit 304, a neighbor node determining unit 306 and a wireless network resource managing unit 308. Particularly, the functional configurations of the network region dividing unit 302 and the network node locating unit 304 are the same as the functional configurations of the network region dividing unit 102 and the network node locating unit 104 in the network management apparatus 100 as described above with reference to FIG. 1 respectively, and thus no details thereof will be repeated herein. Hereinafter, examples of the functional configurations of the neighbor node determining unit 306 and the wireless network resource managing unit 308 will be described in detail.

The neighbor node determining unit 306 may be configured to determine a neighbor node being capable of directly communicating with the network node according to the transmission characteristics of the network node.

Figure 4:
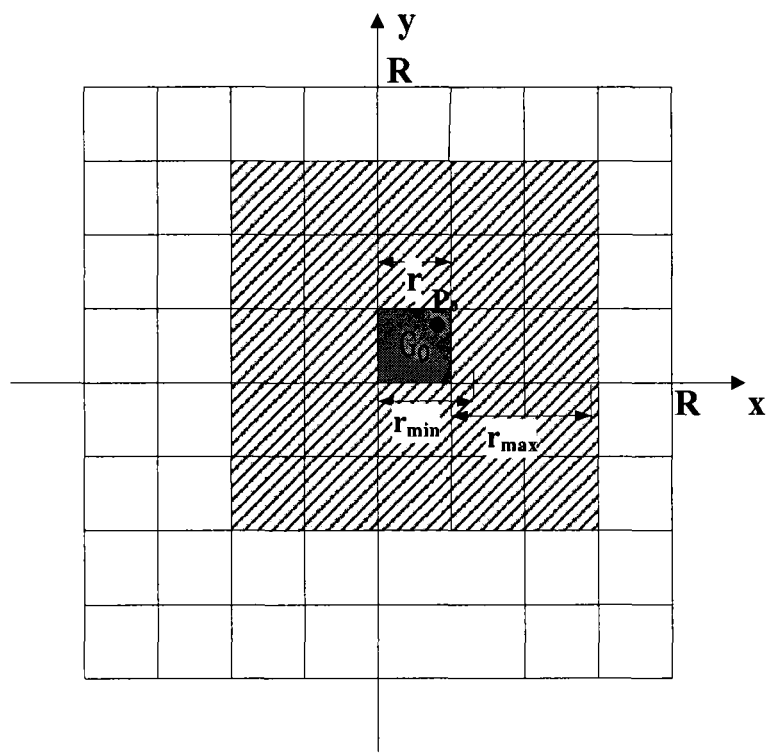
FIG. 4 is a schematic diagram illustrating distribution of neighbor nodes.

A manner of determining distribution of neighbor nodes by the neighbor node determining unit 306 will be described with reference to FIG. 4 in detail below. FIG. 4 is a schematic diagram illustrating distribution of neighbor nodes.

The neighbor node is defined as a node which is able to directly communicate with a target network node, which is mainly affected by a transmission range (including minimum and maximum signal transmission radiuses) of the network node.

Assuming that the minimum and maximum signal transmission radiuses of all the network nodes are the same, which are $r_{min}$ and $r_{max}$ respectively (as shown in FIG. 4), and the target network node is $P_0$, then for any network node $P_i$, if the distance between $P_i$ and $P_0$ satisfies $|P_i-P_0| \leq r_{max}$, then the neighbor node determining unit 306 determines the node $P_i$ as the neighbor node of the target network node $P_0$.

Preferably, since the above described network region dividing unit 302 and the network node locating unit 304 have determined the size of the sub-region and sub-regions in which each of the network nodes locate, the neighbor node determining unit 306 may also reduce calculation complexity of determining the neighbor node of the target network node $P_0$ by means of information about the sub-region in which the target network node $P_0$ locates.

Specifically, assuming that the sub-region in which the target network node $P_0$ locates is $G_0$, which is represented by a shadow grid and has a side length of r, the neighbor determining unit 306 can determine specific distribution of the neighbor nodes by following steps.

S11: first, a maximum distribution range of the neighbor nodes is determined according to the maximum signal transmission radius $r_{max}$. It can be determined from the relationship between r and $r_{max}$ as shown in FIG. 4 for example that the maximum distribution range is the sub-region $G_0$ in which $P_0$ locates and sub-regions out of $G_0$ and within a ring of $$\lceil \frac{r_{max}}{r} \rceil,$$

that is, the sub-region $G_0$ plus the regions represented by the hatched grids in the example of FIG. 4;

S12: then, a minimum distribution range of the neighbor nodes is determined according to the minimum signal transmission radius $r_{min}$, and the network node within the minimum distribution range is necessarily the neighbor node of the target network node $P_0$. It can be determined from the relationship between r and $r_{min}$ as shown in FIG. 4 for example that the minimum distribution range is the sub-region $G_0$ in which $P_0$ locates and a sub-region within $G_0$ and within a ring of $$\lfloor \frac{r_{min}}{r} \rfloor,$$

that is, a sub-region represented by the shadow grid in the example of FIG. 4, i.e., the sub-region $G_0$;

S13: next, for any network node $P_i$ in the region between the maximum distribution range and the minimum distribution range determined in steps S11 and S12, it is judged whether the distance between the network node $P_i$ and the target network node $P_0$ exceeds the maximum signal transmission radius $r_{max}$, and if not, then the node $P_i$ is determined as the neighbor node of the target network node $P_0$.

As can be seen, it is possible to significantly reduce the amount of calculation by roughly determining the distribution range of the neighbor nodes by means of the information about the sub-region in which the target network node locates.

On the other hand, in a case that the maximum and minimum signal transmission radius among the wireless network nodes within the network signal coverage are different from each other, similar to the above described case, the neighbor node of the target network node $P_0$ can be determined by the following steps:

S21: the maximum distribution range of the neighbor nodes is determined according to the maximum signal transmission radius $r_{max}^0$ of the target network node $P_0$ and the side length r of the sub-region, that is, the sub-region $G_0$ in which $P_0$ locates and sub-regions out of $G_0$ and within a ring of $$\lceil \frac{r_{max}}{r} \rceil;$$

S22: for any network node $P_i$ within the maximum distribution range determined in step S21, assuming the maximum signal transmission radius thereof is $r_{max}^i$, if the distance between the nodes $P_i$ and $P_0$ satisfies $|P_i-$ $P_0|\leq\min\{r_{max}^0, r_{max}^i\}$, then the node $P_i$ is determined as the neighbor node of the target network node $P_0$.

Preferably, after determining the neighbor nodes of each of the network nodes by the neighbor node determining unit 306, the wireless network resource managing unit 308 may be configured to construct the wireless network resource management information based on the determined neighbor node. It is to be understood that in this case, the wireless network resource management information includes information about neighbor nodes of any network node, and thus when a network side device for example the base station performs the wireless network management, it is possible to quickly perform dynamic network programming based on the neighbor node information, including but not limited to judging and establishing of Device to Device (D2D) connection and Point-to-Multipoint (PMP) connection among the network nodes and judging of a network node serving as a relay node of other network nodes and establishing of connection therebetween.

Figure 5:
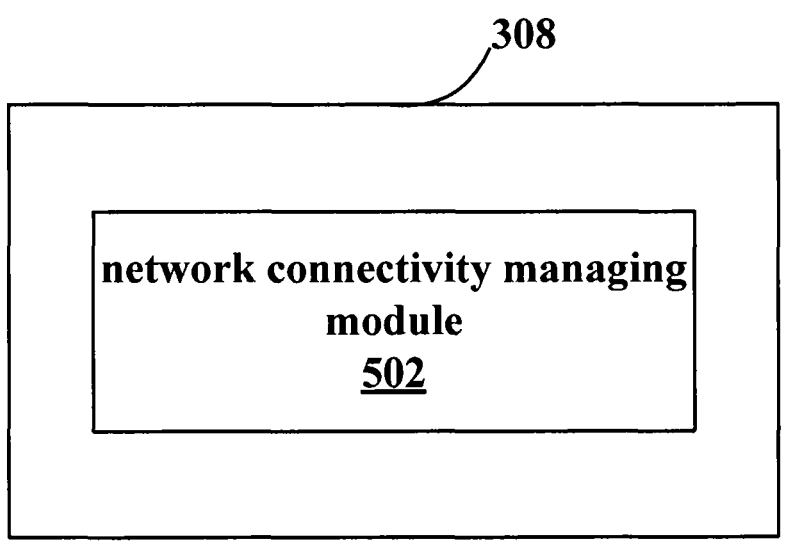
FIG. 5 is a block diagram illustrating an example of functional configuration of a wireless network resource managing unit as shown in FIG. 3.

An example of functional configuration of the wireless network resource managing unit 308 as shown in FIG. 3 will be described with reference to FIG. 5 below. FIG. 5 is a block diagram illustrating an example of functional configuration of the wireless network resource managing unit as shown in FIG. 3.

As shown in FIG. 5, the wireless network resource managing unit 308 may include a network connectivity managing module 502.

The network connectivity managing module 502 may be configured to manage a connected network formed by each network node and its neighbor node, in which any two network nodes within the connected network are able to communicate with each other via at least one wireless path constituted by one or more wireless links.

Preferably, the network connectivity managing module 502 may be further configured to manage a connected sub-region network which is formed by sub-regions in which each of the network nodes within the connected network locates and which corresponds to the connected network.

It is to be noted that the connected work per se can satisfy any requirements about link selection and connectivity management, but for a Multi-hop network with a large number of network nodes, the management has low efficiency, and especially for a circumstance in which the node has mobility at high speed. Therefore, in the disclosure, the connected sub-region network is introduced, which aims to perform quick management for variation in original connected network due to movement or variation in status of part of the network nodes, which may be distributed in one or more adjacent sub-regions.

Figure 6:
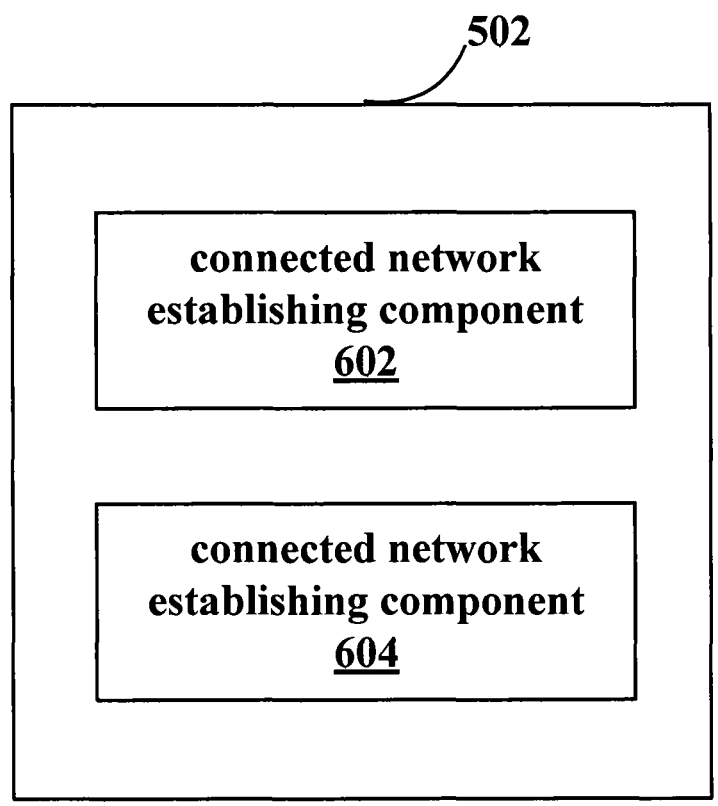
FIG. 6 is a block diagram illustrating an example of functional configuration of a network connectivity managing module as shown in FIG. 5.

Next, an example of functional configuration of the network connectivity managing module 502 as shown in FIG. 5 will be described with reference to FIG. 6. FIG. 6 is a block diagram illustrating an example of functional configuration of the network connectivity managing module as shown in FIG. 5.

As shown in FIG. 6, the network connectivity managing module 502 may include a connected network establishing component 602 and a connected work updating component 604.

The connected network establishing component 602 may be configured to establish the connected network and the corresponding connected sub-region network within the network signal coverage according to the determined neighbor node.

Specifically, the connected network establishing component 602 may be configured to establish, for any target network node, the connected network formed by all of relevant network nodes related to the target network node and the target network node based on the relevant network nodes, in which the relevant network nodes include a neighbor node of the target network node and a network node which is able to communicate with the target network node via the neighbor node. The connected network establishing component 602 may also establish the connected sub-region network corresponding to the connected network according to the sub-region in which the target network node locates and sub-regions in which the relevant network nodes locate.

It is to be understood that the foregoing relevant network nodes of the target network node include the neighbor nodes of the target network node and all the network nodes directly and/or indirectly communicating with the target network node via the neighbor nodes, which can be located within the same sub-region as the target network node or can also be located within different sub-regions.

Figure 7:
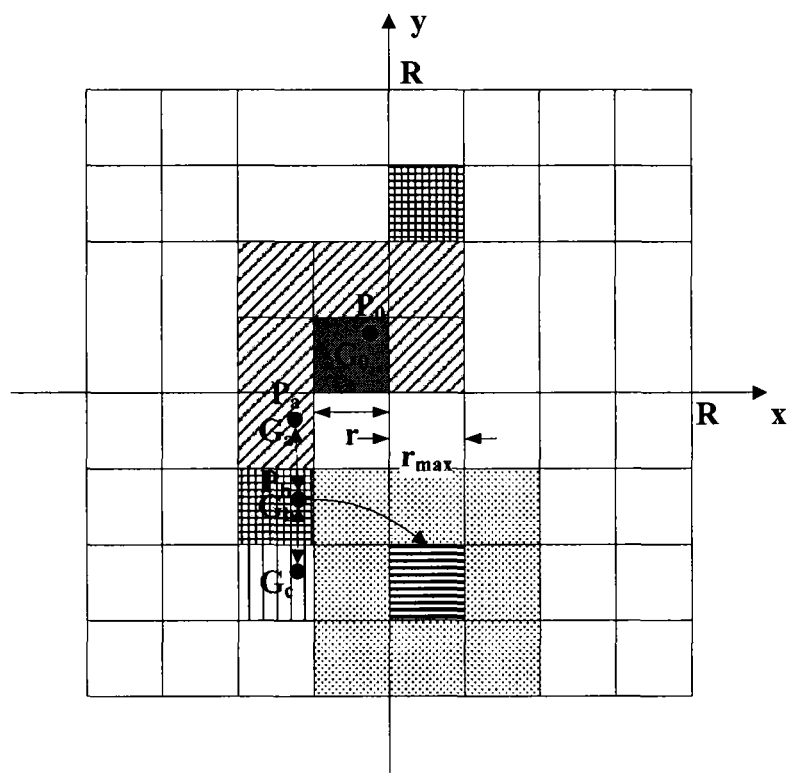
FIG. 7 is a schematic diagram illustrating distribution of a connected network and a connected sub-region network.

A procedure of establishing the connected network and the corresponding connected sub-region network by the connected work establishing component 602 will be described with reference to FIG. 7 in detail below. FIG. 7 is a schematic diagram illustrating distribution of the connected network and the connected sub-region network.

As an example, as shown in FIG. 7, assuming that the target network node is $P_0$ and is located within the sub-region $G_0$, the connected network establishing component 602 may establish the connected network including the target network node $P_0$ and the corresponding connected sub-region network by following steps:

S31: a connected network $N_0$ within the sub-region $G_0$ in which the target network node $P_0$ locates is established. Specifically, all neighbor nodes $P_i$ of the target network node $P_0$ are found within the sub-region $G_0$, then neighbor nodes $P_i'$ of all these neighbor nodes $P_i$ are continued to be found within the sub-region $G_0$, such operation is repeated until no new network node within the sub-region $G_0$ joins this connected network. As such, the connected network $N_0$ within the sub-region $G_0$ in which the target network node $P_0$ locates is established;

S32: a neighbor sub-region for the sub-region $G_0$ with respect to the connected network $N_0$ is found. The neighbor sub-region is defined as follows: if there is a wireless link within the network and the network nodes at both ends thereof are located within two sub-regions respectively, then these two sub-regions are neighbor sub-regions with respect to each other regarding this network. The specific procedure of finding the neighbor sub-region for the sub-region $G_0$ with respect to the connected network $N_0$ is to: find neighbor nodes $Q_i$ which are not within the network $N_0$ for all the network nodes within the connected network $N_0$, and the sub-regions in which these neighbor nodes locate constitute a set of neighbor sub-regions for the sub-region $G_0$ with respect to the connected network $N_0$, which is written as $\{G_{1,i1}\}$ (as shown by hatched grids in FIG. 7);

S33: a connected network is established within the neighbor sub-regions obtained in step S32. Specifically, for each sub-region in the set of neighbor sub-regions $\{G_{1,i1}\}$, a connected network including the found neighbor nodes $Q_i$ of the network nodes within the connected network $N_0$ is established within this sub-region using the method as described in step S31, and all of these connected networks constitute a set $\{N_{1,i1}\}$;

S34: a set of neighbor sub-regions of each sub-region $G_{1,i1}$ within the set of neighbor sub-regions $\{G_{1,i1}\}$ with respect to its connected network $N_{1,i1}$ is found, and a connected network is established within each sub-region. As such, the processing in step S34 is repeated until no new node can join the established connected network. Finally, the connected network $N_{P0}$ including the target network node $P_0$ is established;

S35: a connected sub-region network $\overline{N_{P0}}$ is established. Specifically, during the procedure of establishing the connected network $N_{P0}$, neighborhood relationship among the sub-regions with respect to the connected network $N_{P0}$ is obtained at the same time, and thus the connected sub-region network with respect to the connected network $N_{P0}$ is established, which is written as $\overline{N_{P0}}$ and describes connection relationship among the sub-regions. As shown in FIG. 7, for sub-regions $G_a$ and $G_b$, since the network nodes $P_a$ and $P_b$ on both ends of a wireless link in the connected network $N_{P0}$ are located within the sub-regions $G_a$ and $G_b$ respectively, and thus the sub-regions $G_a$ and $G_b$ are neighborhoods with respect to each other regarding the connected network $N_{P0}$.

It is to be understood that although the specific procedure of establishing the connected network and corresponding connected sub-region network by the connected network establishing component 602 has been described above with reference to FIG. 7, it should understand that this is only exemplary but not limitation, and those skilled in the art may adopt other algorithms to establish the connected network and connected sub-region network according to the principle of the disclosure, that is, first finding neighbor nodes of the target network node within the network signal coverage, then finding neighbor nodes of the neighbor nodes, and repeating such operation until no network node position satisfying such requirements can be found within the network signal coverage, and all the found network nodes and the target network node constitute the connected network, and the sub-regions in which these network nodes locate constitute the connected sub-region network corresponding to the connected network.

Returning back to FIG. 6, the connected network updating component 604 may be configured to update the established connected network and connected sub-region network according to status and/or motion feature of the network node.

Preferably, the connected network updating component 604 may be configured to update, when the status and/or motion feature of the network node changes, the established connected network and connected sub-region network according to variations in the connected network and the connected sub-region network in which the network node is involved.

Specifically, the variations in the connected network and the connected sub-region network due to variations in the status and/or motion feature of the network node mainly include three circumstances. Below, these three circumstances will be described in detail respectively.

a) Circumstance 1: a connected network is caused to be newly established due to join of a new target network node or recovery of operation status of an originally sleeping target network node. In this circumstance, first, neighbor nodes of the target network node are found, and if all the neighbor nodes do not belong to any existing connected network, the connected network updating component 604 establishes a new connected network through the operations performed by the above described connected network establishing component 602 so as to update the existing connected network; if all the neighbor nodes belong to the same existing connected network, the connected network updating component 604 directly adds the target network node to this connected network; if all the neighbor nodes belong to different existing connected networks respectively, the connected network updating component 604 combines these connected networks into one connected network; and if part of the neighbor nodes do not belong to any existing connected network, the part of the neighbor nodes are combined with the existing connected network to be one connected network, and neighbor nodes of the part of the neighbor nodes are continued to be found until no new node can join this combined connected network. At the same time, the connected network updating component 604 further adds the connectivity between the involved sub-regions, thereby updating the existing connected sub-region network.

b) Circumstance 2: the target network node turns off or the target network node goes into sleep status. In this circumstance, first, association between the target network node and neighbor nodes in the connected network in which the target network node locates is cancelled, then connectivity among the sub-regions in which respective neighbor nodes locate is checked, if the connectivity is maintained (that is, a connected path connecting these sub-regions can be found), then they still belong to the same connected sub-region network, otherwise they belong to different connected sub-region networks, thereby dividing the original connected sub-region network into a plurality of sub connected sub-region networks. At this time, each sub connected sub-region network is independently connected, but respective sub connected sub-region networks are not connected with each other. The connected network updating component 604 whereby updates the existing connected network and connected sub-region network.

c) Circumstance 3: variations in the connected network and connected sub-region network are caused due to motion of the target network node. In this circumstance, the connected network updating component 604 judges when the target network node loses connectivity with the original connected network according to a series of sub-regions in which the target network node locates sequentially during the motion obtained from the motion feature of the target network node. For example, as shown in FIG. 7, there is one mobile network node $P_b$ which moves along a direction indicated by an arrow in a sub-region $G_b$, as can be known from the maximum signal transmission radius $r_{max}$ of the network node $P_b$, when $P_b$ moves into a grid region with traverse lines, its signal coverage does not overlap with the connected sub-region network, and thus $P_b$ loses connectivity with the original connected network. At this time, the connected network and the connected sub-region network are updated according to the Circumstance 2). For example, assuming there is only one node $P_b$ in the sub-region $G_b$, when the node $P_b$ is no longer connected with the original connected network, the sub-regions $G_a$ and $G_c$ lose connectivity and are divided into two sub connected sub-region networks.

According to the above embodiments, the network connectivity managing module 502 in the wireless network resource managing unit 308 provides basis of quick link selection for the dynamic network programming by establishing the connected network among network nodes and the connected sub-region network among the sub-regions in which the connected networks locate according to signal transmission ranges of the network nodes and updating connectivity of existing connected networks and connected sub-region networks according to operation status and/or motion feature of the network nodes.

Figure 8:
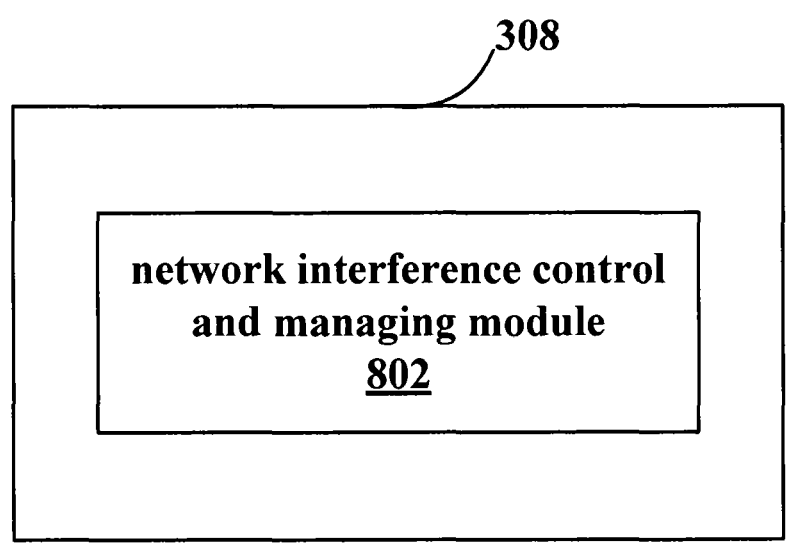
FIG. 8 is a block diagram illustrating another example of functional configuration of the wireless network resource managing unit as shown in FIG. 3.

Hereinafter, another example of functional configuration of the wireless network resource managing unit 308 as shown in FIG. 3 will be described with reference to FIG. 8. FIG. 8 is a block diagram illustrating another example of functional configuration of the wireless network resource managing unit 308.

As shown in FIG. 8, the wireless network resource managing unit 308 may further include a network interference control and managing module 802.

The network interference control and managing module 802 may be configured to estimate an interference range of wireless network resources used in communication between each network node and its neighbor node and manage wireless network resources available to each network node according to the estimated interference range.

Figure 9:
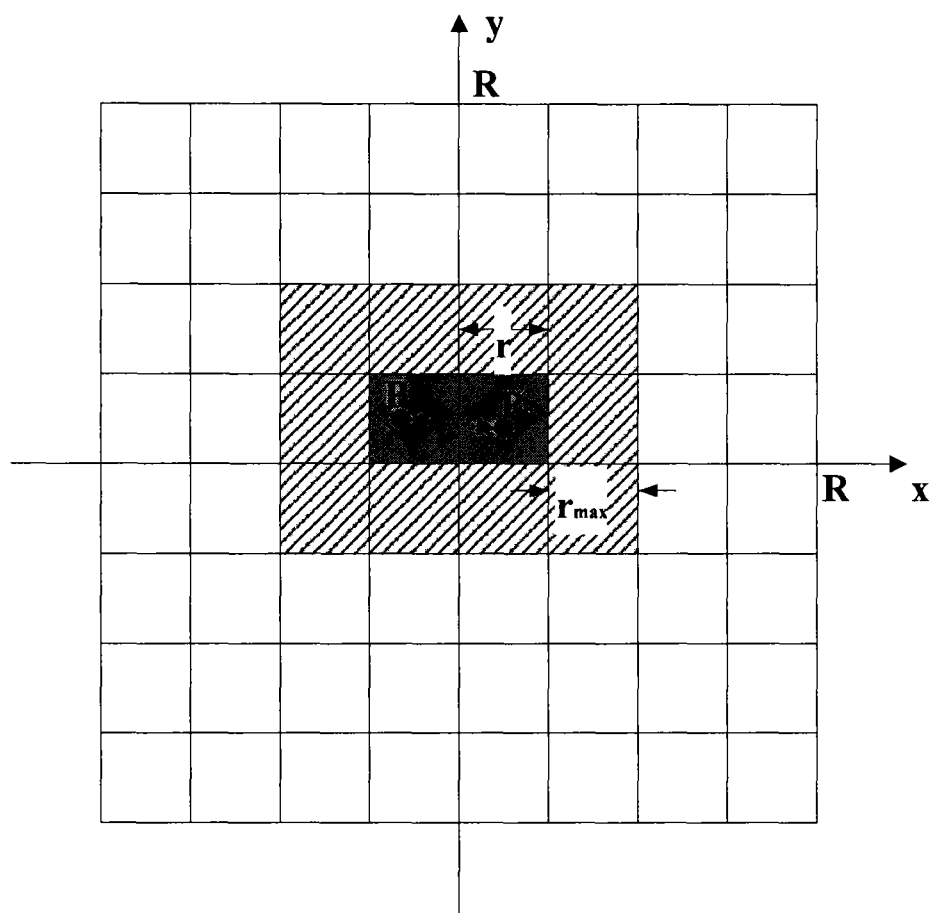
FIG. 9 is a schematic diagram illustrating an interference range of a wireless link.

Specifically, determination of the wireless link interference range will be described with reference to FIG. 9. FIG. 9 is a schematic diagram illustrating the wireless link interference range.

The wireless link interference range is defined as a range in which when network nodes at both ends of the wireless link communicate with each other, a signal strength of the used wireless network resources (frequency spectrum resources herein) exceeds a predetermined signal strength threshold. For example, as shown in FIG. 9, assuming the network nodes $P_a$ and $P_b$ at both ends of the wireless link fall within two adjacent sub-regions (represented by shadow grids) respectively, when the signal strength threshold is set as a signal strength of the maximum signal transmission radius, it can be determined that the regions represented by shadow grids and hatched grids are coverage in which the required signal strength exceeds the predetermined signal strength threshold, that is, the interference range of the wireless link.

According to the above determined interference range of each wireless link, the interference range of the connected network can be determined, that is, a range in which the signal strength of each frequency spectrum used when all the wireless links in the connected network communicate with each other exceeds the predetermined signal strength threshold. The interference range of the connected network can be determined by utilizing the obtained interference range of each single wireless link and superposing the interference ranges of a plurality of wireless links using the same frequency spectrum.

In a case that the number of the network nodes is relatively great, amount of processing of managing the wireless network resources in a unit of network node may be too large, and thus preferably, the wireless network resource management can be performed in a unit of sub-region in which each network node locates.

Preferably, the network interference control and managing module 802 may be further configured to manage wireless network resources available to the sub-region in which each network node locates according to the estimated interference range.

Further, preferably, the network interference control and managing module 802 may be further configured to establish a distribution map of available wireless network resources for each sub-region according to the wireless network resources available to each sub-region.

Specifically, the network interference control and managing module 802 may identify a given frequency spectrum as available to a region out of the interference range of the given frequency spectrum according to the determined interference range of the connected network as described above, perform such operation on each of the frequency spectrums sequentially, thereby establishing a list of available frequency spectrum resources for each sub-region, and establish a distribution map of available frequency spectrum resources within the network signal coverage according to the list.

Further, preferably, when the status and/or motion feature of the network node changes, the network interference control and managing module 802 may be further configured to re-determine the interference range of the wireless network resources in which the network node is involved, and update the original distribution map of available wireless network resources according to the re-determined interference range.

As can be seen from the above description, by estimating the sub-regions covered by the interference ranges of the wireless link and the connected network and establishing a list of available wireless network resources of each sub-region thereby obtaining the distribution map of available wireless network resources within the network signal coverage by the network interference control and managing module 802, it is possible to provide basis of quick decision for fine resource allocation of the network and wireless network resource allocation of mobile network nodes.

Figure 10:
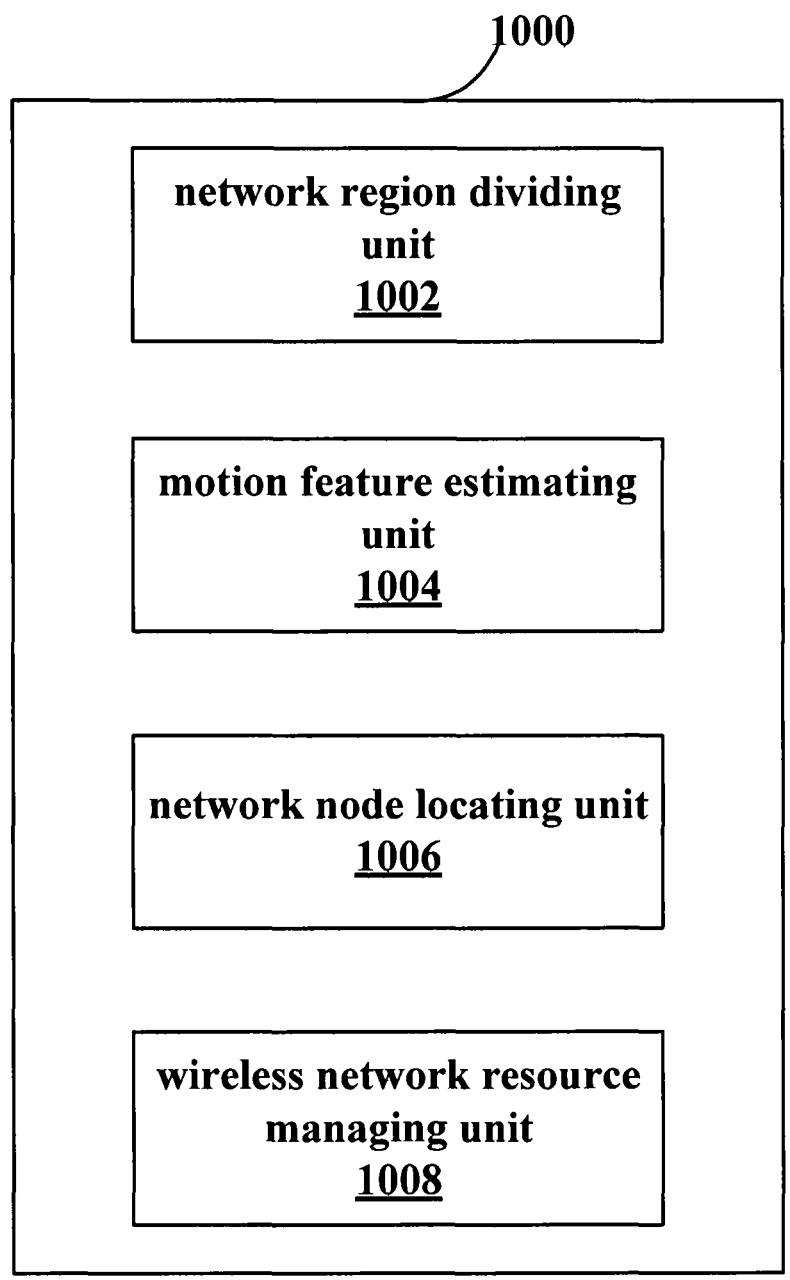
FIG. 10 is a block diagram illustrating an example of functional configuration of a network managing apparatus in a wireless communication system according to yet another embodiment of the disclosure.

An example of functional configuration of a network management apparatus in a wireless communication system according to yet another embodiment of the disclosure will be described with reference to FIG. 10 below. FIG. 10 is a block diagram illustrating an example of functional configuration of a network management apparatus in a wireless communication system according to yet another embodiment of the disclosure.

As shown in FIG. 10, the network management apparatus 1000 may include a network region dividing unit 1002, a motion feature estimating unit 1004, a network node locating unit 1006 and a wireless network resource managing unit 1008. Particularly, the functional configuration of the network region dividing unit 1002 is the same as those of the network region dividing units 102 and 302 in the network management apparatuses 100 and 300 as described above with reference to FIGS. 1 and 3 respectively, and thus no details thereof will be repeated herein. Examples of the functional configurations of the motion feature estimating unit 1004, the network node locating unit 1006 and the wireless network resource managing unit 1008 will be described in detail below.

The motion feature estimating unit 1004 may be configured to estimate a motion feature of the network node in a unit of sub-region.

Specifically, the motion feature estimating unit 1004 may obtain the motion feature (including the motion direction and rate) of the target network node through measurement and calculation, map the obtained motion feature into a rate value in the coordinate system as established when dividing the sub-regions by the network region dividing unit 1002, and may also predict feature motion condition of the network node according to this value. At this time, the motion rate of the target network node can be characterized by the number of sub-regions that the network node being spanned during unit time.

The network node locating unit 1006 may be configured to determine a series of sub-regions that the network node passes through within a predetermined time period and a time during which the network node resides in each sub-region according to the motion feature of the network node and in combination with the current geographic position information of the network node, thereby obtaining a locating result of the network node.

It is to be understood that depending on the different motion statuses of the network node, the network node locating unit 1006 obtains different locating results. For example, for a stationary network node, its locating result is the sub-region in which the network node is located currently; for a nomadism node, that is, a network node which may stay at a certain position for a time period after moving to the position, after measurement within a predetermined time, its locating result is a plurality of sub-regions in which the network node is located within the predetermined time; and for a mobile node, that is, a network node which continuously moves without staying, after measurement within a predetermined time, its locating result is a series of sub-regions in which the network node is located sequentially during the motion within the predetermined time.

The wireless network resource managing unit 1008 may be configured to group the network node according to the locating result and the motion feature of the network node, and construct the wireless network resource management information according to the grouped network node.

Specifically, the wireless network resource managing unit 1008 identifies nodes whose positions are close to each other (for example, located in the same sub-region or located in a plurality of neighboring sub-regions) and which have the same motion feature (that is, the same motion direction and motion rate) as one group according to the locating result and the motion feature of the network node, and constructs the wireless network resource management information according to the groups.

It is to be understood that by grouping the network nodes, it is possible to greatly save the amount of calculation when for example performing the above network connectivity management (for example establishing and updating of the connected network and the connected sub-region network) and the network interference control and management (for example, establishing and updating of the distribution map of the available wireless network resources), thereby improving the processing efficiency, and the dynamic network programming and wireless network resource allocation can be realized more efficiently, thereby improving the network performance, and such effect is especially evident for the case of the network node with high mobility.

Further, it is also to be understood that at least one piece of the information related to the neighbor node, the connected network, the connected sub-region network, the distribution map of the available wireless network resources, the motion feature and so on obtained by each of the functional components described above is included in the wireless network resource management information so as to be used for performing quick dynamic network programming and wireless network resource allocation in the wireless communication system by the network side device, e.g., the base station.

It is to be noted herein that although exemplary functional configurations of the wireless management apparatus in the wireless communication system according to the embodiments of the disclosure have been described above with reference to FIGS. 1-10, it should understand that these are merely examples but not limitation, and those skilled in the art may modify the above structures as required, for example, add or omit some functional units or combine the functional units, and all these variations should be considered as falling within the substantive scope of the present technique.

Figure 11:
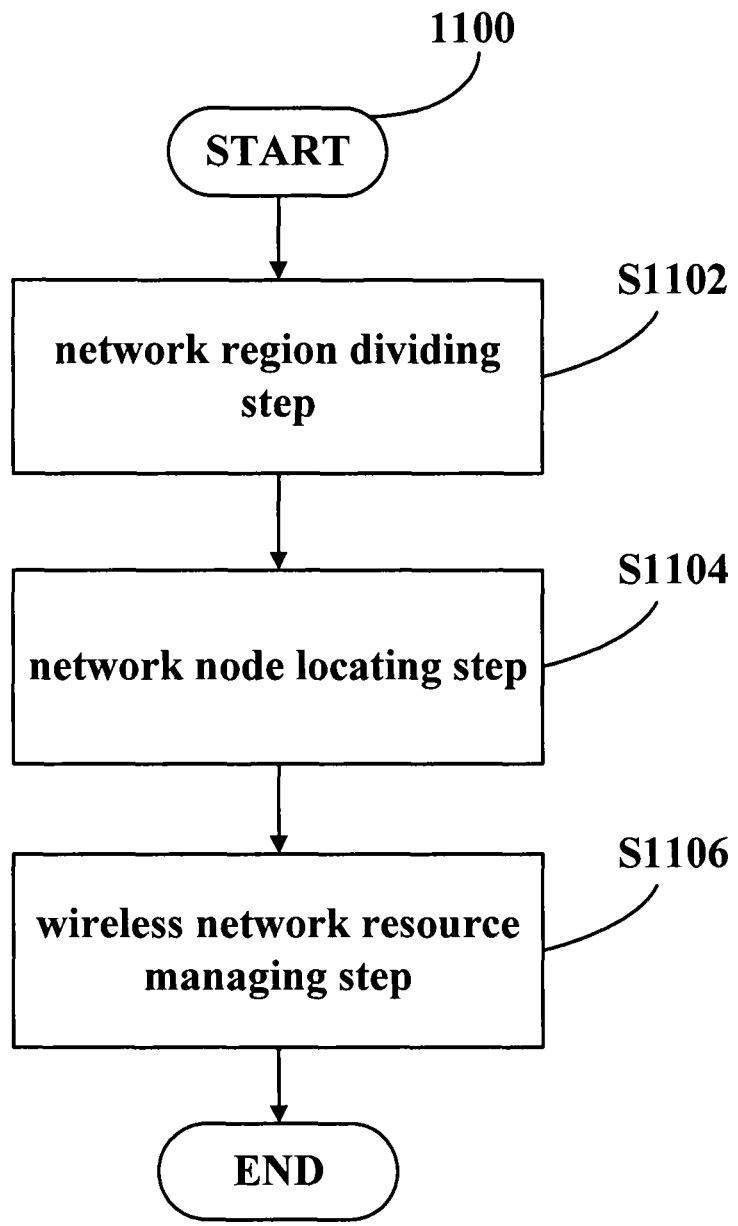
FIG. 11 is a flow chart illustrating an example of a flow of a method for use in a wireless communication system according to an embodiment of the disclosure.

Corresponding to the network management apparatus in the wireless communication system according to the embodiments of the disclosure, there is also provided a method for use in the wireless communication system. An example of a flow of a method for use in a wireless communication system according to an embodiment of the disclosure will be described with reference to FIG. 11 below. FIG. 11 is a flow chart illustrating an example of a flow of a method for use in a wireless communication system according to an embodiment of the disclosure.

As shown in FIG. 11, the method 1100 may include a network region dividing step S1102, a network node locating step S1104 and a wireless network resource managing step S1106.

First, in the network region dividing step S1102, the network signal coverage may be divided into a plurality of sub-regions according to transmission characteristics of a network node. Preferably, in the network region dividing step S1102, a size of the sub-region may be determined according to an object of network region division.

Next, the method proceeds to step S1104.

In the network node locating step S1104, a sub-region in which the network node locates within the network signal coverage may be determined according to geographic position information of the network node, then the method proceeds to step S1106.

In the wireless network resource managing step S1106, wireless network resource management information may be constructed according to the sub-region in which the network node locates.

Figure 12:
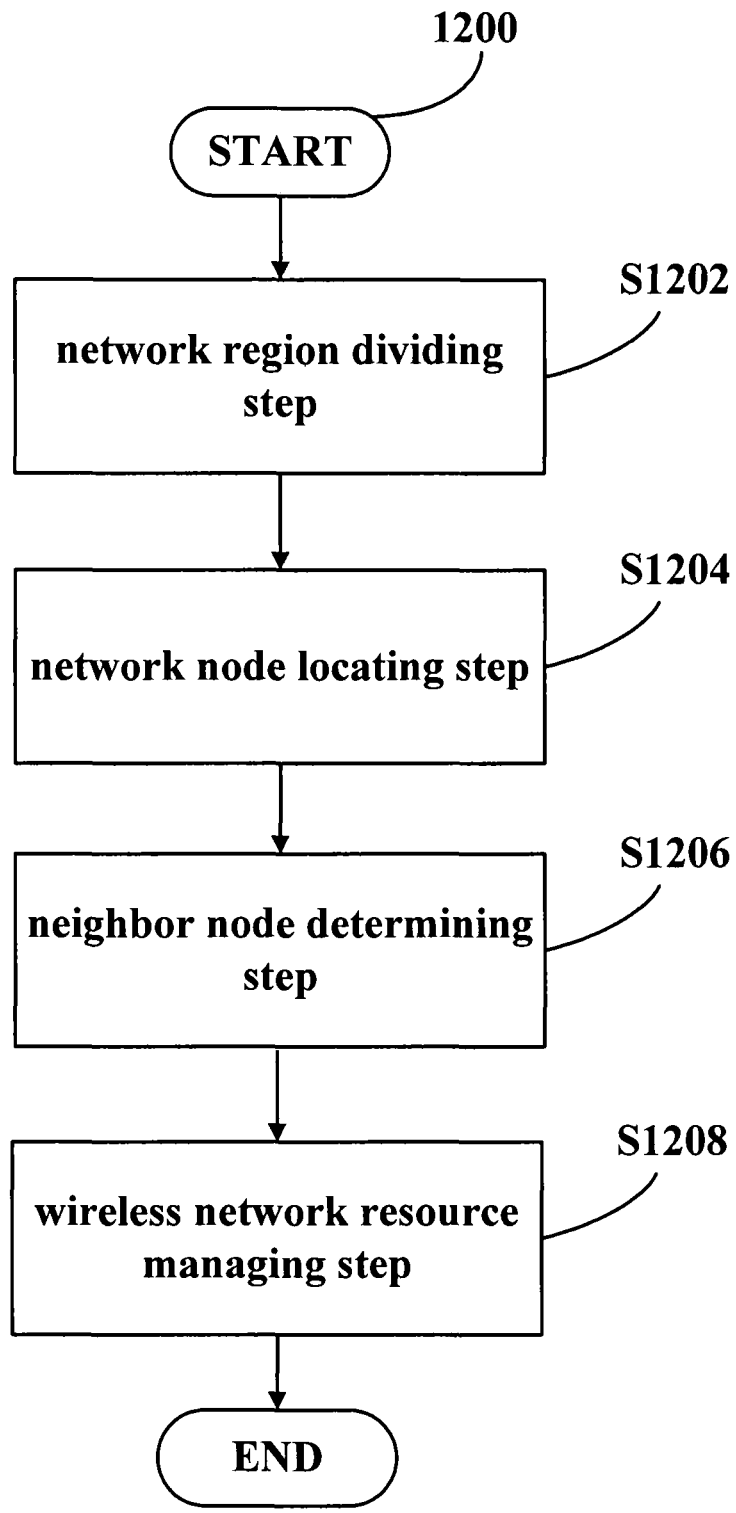
FIG. 12 is a flow chart illustrating an example of a flow of a method for use in a wireless communication system according to another embodiment of the disclosure.

An example of a flow of a method for use in a wireless communication system according to another embodiment of the disclosure will be described with reference to FIG. 12 below. FIG. 12 is a flow chart illustrating an example of a flow of a method for use in a wireless communication system according to another embodiment of the disclosure.

As shown in FIG. 12, the method 1200 may include a network region dividing step S1202, a network node locating step S1204, a neighbor node determining step S1206 and a wireless network resource managing step S1208. Particularly, the processing in the network region dividing step S1202 and the network node locating step S1204 is the same as that in the network region dividing step S1102 and the network node locating step S1104 in the method 1100 described above with reference to FIG. 11, and thus no details thereof will be repeated herein. Hereinbelow, the neighbor node determining step S1206 and the wireless network resource managing step S1208 will be mainly described in detail.

After the steps S1202 and S1204, the method proceeds to step S1206. In the neighbor node determining step S1206, a neighbor node being capable of directly communicating with the network node may be determined according to the transmission characteristics of the network node. Then, the method proceeds to step S1208.

In the wireless network resource managing step S1208, the wireless network resource management information may be constructed based on the neighbor node determined in step S1206.

Figure 13:
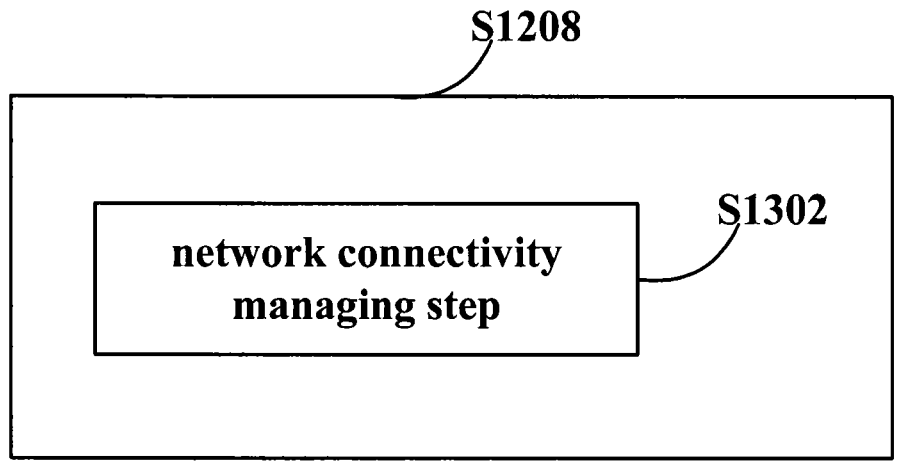
FIG. 13 is a flow chart illustrating an example of detailed processing in a wireless network resource managing step as shown in FIG. 12.

The processing in the wireless network resource managing step S1208 will be described in detail with reference to FIG. 13 below. FIG. 13 is a flow chart illustrating an example of detailed processing in the wireless network resource managing step as shown in FIG. 12.

As shown in FIG. 13, the wireless network resource managing step S1208 may further include a network connectivity managing step S1302.

In the network connectivity managing step S1302, a connected network formed by each network node and its neighbor node may be managed. Particularly, any two network nodes within the connected network are able to communicate with each other via at least one wireless path constituted by one or more wireless links.

Preferably, in the network connectivity managing step S1302, a connected sub-region network which is formed by sub-regions in which each of the network nodes within the connected network locates and which corresponds to the connected network may be further managed.

Figure 14:
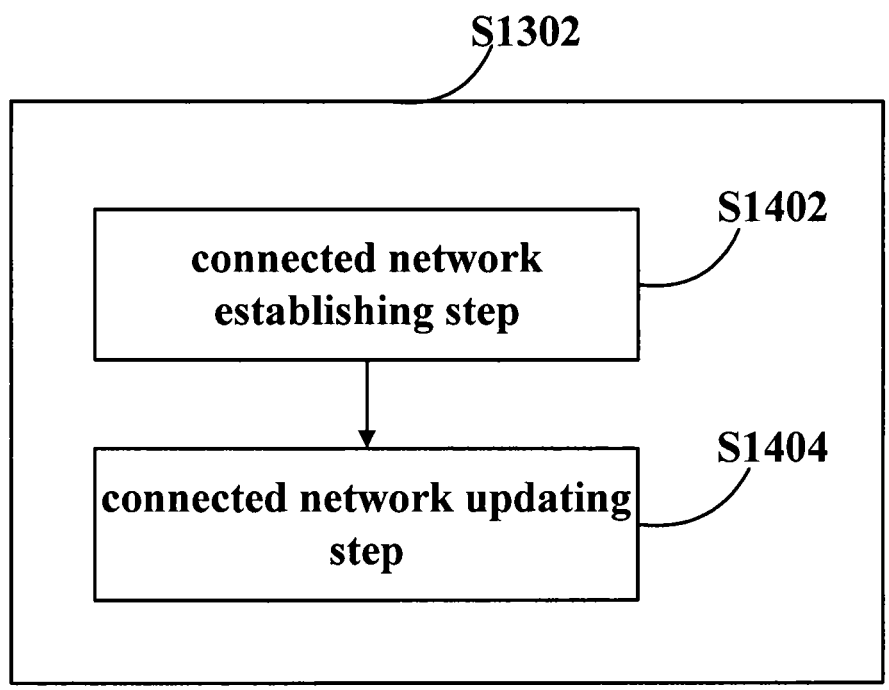
FIG. 14 is a flow chart illustrating an example of detailed processing in a network connectivity managing step as shown in FIG. 13.

The processing in the network connectivity managing step S1302 will be described in detail with reference to FIG. 14 below. FIG. 14 is a flow chart illustrating an example of detailed processing in the network connectivity managing step as shown in FIG. 13.

As shown in FIG. 14, the network connectivity managing step S1302 may further include a connected network establishing step S1402 and a connected network updating step S1404.

First, in the connected network establishing step 1402, a connected network and a connected sub-region network within the network signal coverage may be established according to the determined neighbor node.

Specifically, in the connected network establishing step S1402, for any target network node, the connected network formed by all of relevant network nodes related to the target network node and the target network node is established based on the relevant network nodes, and the connected sub-region network corresponding to the connected network is established according to a sub-region in which the target network node locates and sub-regions in which the relevant network nodes locate.

Then, the method proceeds to step S1404.

In the connected network updating step S1404, the established connected network and connected sub-region network may be updated according to the status and/or motion feature of the network node.

Specifically, in the connected network updating step S1404, when the status and/or motion feature of the network node changes, the established connected network and connected sub-region network may be updated according to variations in the connected network and the connected sub-region network in which the network node is involved.

Figure 15:
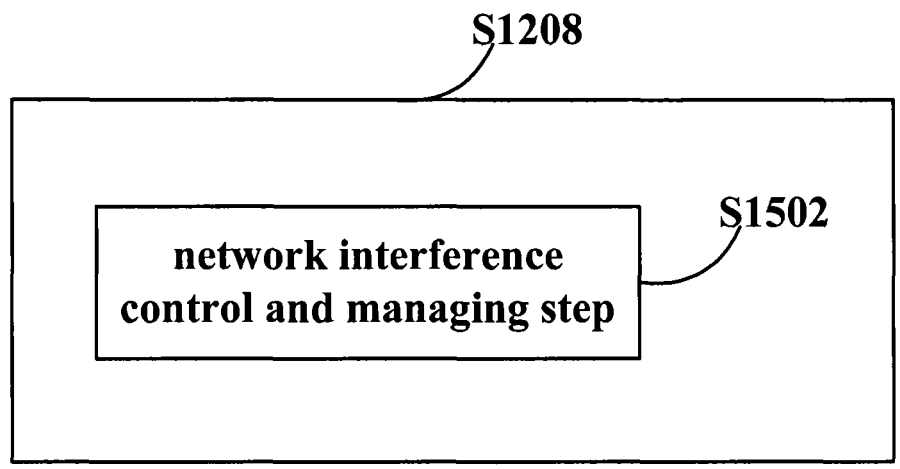
FIG. 15 is a flow chart illustrating another example of detailed processing in the wireless network resource managing step as shown in FIG. 12.

Next, another example of detailed processing in the wireless network resource managing step S1208 will be described with reference to FIG. 15. FIG. 15 is a flow chart illustrating another example of detailed processing in the wireless network resource managing step as shown in FIG. 12.

As shown in FIG. 15, the wireless network resource managing step S1208 may further include a network interference control and managing step S1502.

In the network interference control and managing step S1502, an interference range of wireless network resources used in communication between each network node and its neighbor node may be estimated, and the wireless network resources available to each network node may be managed according to the estimated interference range.

Preferably, in the network interference control and managing step S1502, the wireless network resources available to the sub-region in which each network node locates may be further managed according to the estimated interference range.

Further, preferably, in the network interference control and managing step S1502, a distribution map of available wireless network resources for each sub-region may be established according to the wireless network resources available to each sub-region.

Further, preferably, in the network interference control and managing step S1502, when the status and/or motion feature of the network node changes, the interference range in which the network node is involved may be re-determined, and the existing distribution map of available wireless network resources is updated according to the re-determined interference range.

Figure 16:
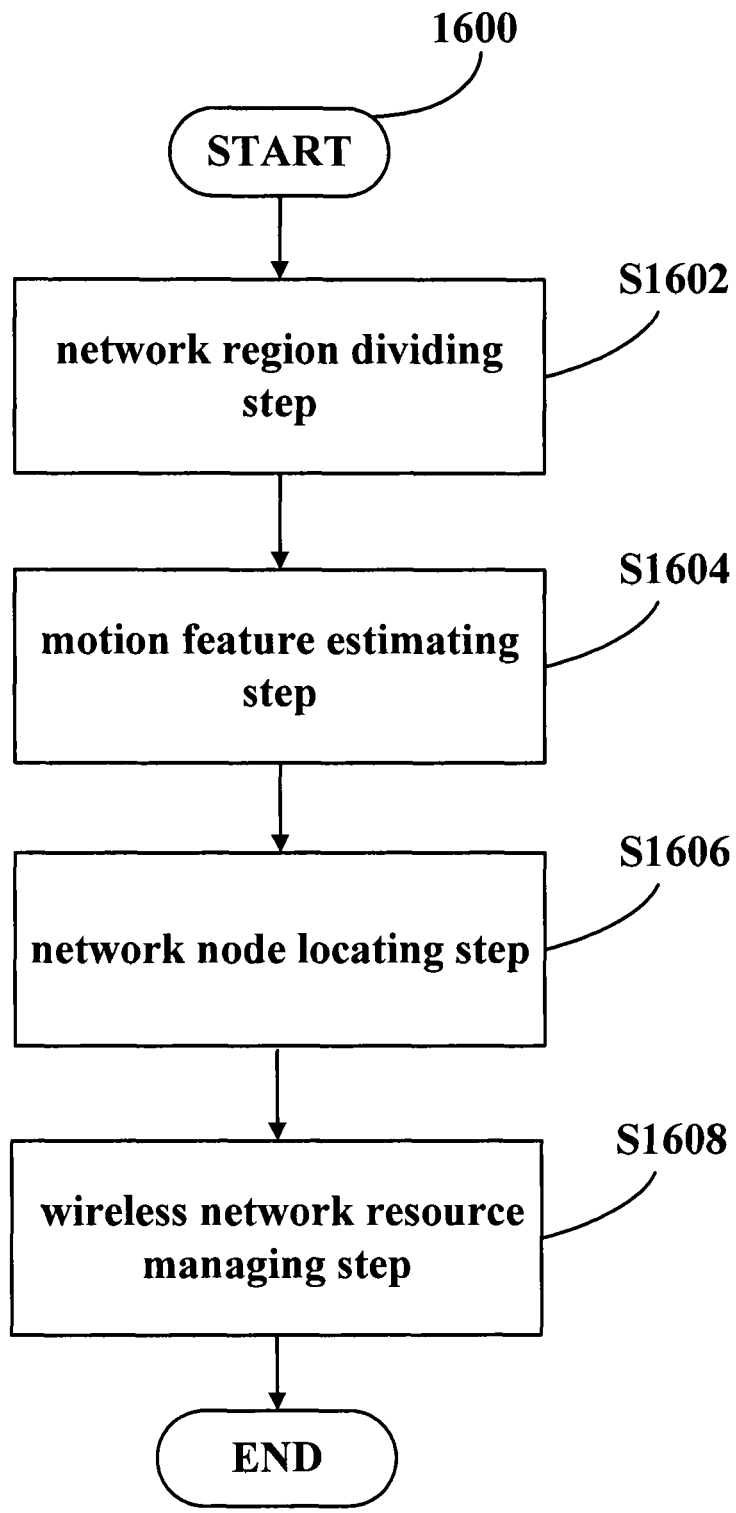
FIG. 16 is a flow chart illustrating an example of a flow of a method for use in a wireless communication system according to yet another embodiment of the disclosure.

An example of a flow of a method for use in a wireless communication system according to yet another embodiment of the disclosure will be described with reference to FIG. 16 below. FIG. 16 is a flow chart illustrating an example of a flow of a method for use in a wireless communication system according to yet another embodiment of the disclosure.

As shown in FIG. 16, the method 1600 may include a network region dividing step S1602, a motion feature estimating step S1604, a network node locating step S1606 and a wireless network resource managing step S1608. Particularly, the network region dividing step S1602 is the same as the processing in the network region dividing steps S1102 and S1202 in the methods 1100 and 1200 as described above with reference to FIGS. 11 and 12 respectively, and no details thereof will be repeated herein. Hereinafter, the motion feature estimating step S1604, the network node locating step S1606 and the wireless network resource managing step S1608 will be described in detail.

In the motion feature estimating step S1604, a motion feature of the network node may be estimated in a unit of sub-region. Next, the method proceeds to step S1606.

In the network node locating step S1606, a series of sub-regions that the network node passes through within a predetermined time period and a time during which the network node resides in each sub-region may be determined according to the motion feature and the geographic position information of the network node, thereby obtaining a locating result of the network node. Thereafter, the method proceeds to step S1608.

In the wireless network resource managing step S1608, the wireless network resource management information may be constructed according to the locating result and the motion feature of the network node.

Preferably, in the wireless network resource managing step S1608, the network node may be grouped according to the locating result and the motion feature of the network node, and the wireless network resource management information may be constructed according to the grouped network node.

Although the method for use in the wireless communication system according to the embodiments of the disclosure have been described above in connection with FIGS. 11-16, those skilled in the art should appreciate that the flow charts as shown in the drawings are only exemplary, and the above method flows can be accordingly modified according to different actual applications and specific requirements.

It is to be noted that the method for use in the wireless communication system according to the embodiments of the disclosure corresponds to the foregoing apparatus embodiments, and thus the portions which are not described in detail in the method embodiments can be referred to the description at corresponding position in the apparatus embodiments, and no repeated description will be made herein.

As described above, it is possible to provide basis of quick decision for dynamic network programming and wireless network resource allocation by utilizing the network connectivity management service and the interference control and managing service according to the embodiments of the disclosure. Specific application examples of the invention will be given below.

Figure 17:
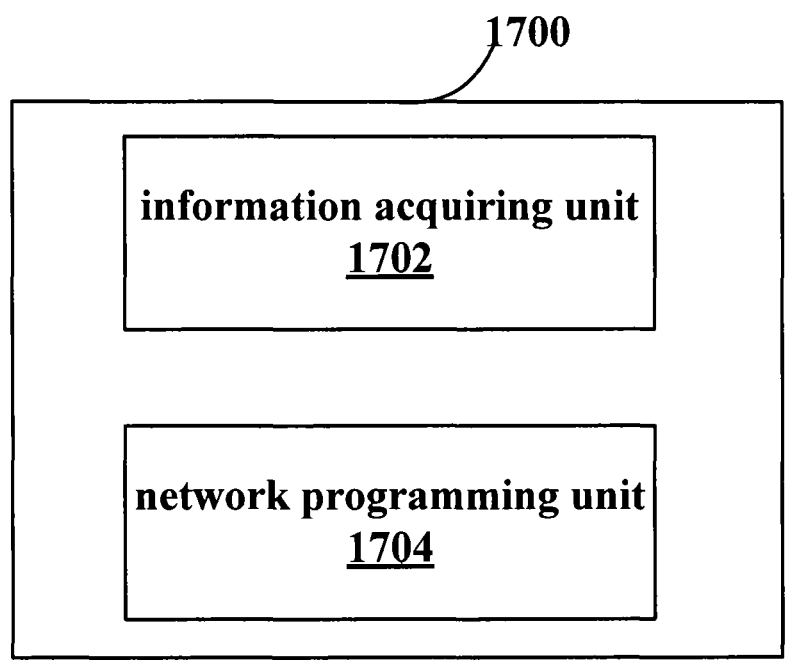
FIG. 17 is a block diagram illustrating an example of functional configuration of an apparatus in a wireless communication system according to an embodiment of the disclosure.

An example of functional configuration of an apparatus in a wireless communication system according to an embodiment of the disclosure will be described with reference to FIG. 17 now. FIG. 17 is a block diagram illustrating an example of functional configuration of an apparatus in a wireless communication system according to an embodiment of the disclosure.

As shown in FIG. 17, the apparatus 1700 may include an information acquiring unit 1702 and a network programming unit 1704. The apparatus 1700 may be an apparatus at network side, for example, the base station for providing service for network nodes within the coverage or the like.

The information acquiring unit 1702 may be configured to acquire wireless network resource management information provided by the network management apparatus in the wireless communication system described above. The wireless network resource management information herein may include for example information about the sub-region in which the network node locates within the network signal coverage, information about the neighbor node of the network node, information about distribution of the connected network and the connected sub-region network within the network signal coverage and the distribution map of the available wireless network resources for each of the sub-regions within the network signal coverage and so on, and these pieces of information may be stored in a database which for example is included in a storage unit provided in the apparatus 1700.

The network programming unit 1704 may be configured to perform network programming according to the acquired wireless network resource management information, including for example link selection and network establishment. For example, when a communication request initiated by a network node is received, the network programming unit 1704 may quickly judge whether the network node is able to establish connection with the requested destination node according to the acquired wireless network resource management information, and make the network node communicate with the destination node via the selected communication path in a case that it is judged the connection can be established.

Specifically, for a case of establishing D2D connection with respect to any network node, the network programming unit 1704 may be configured to check, upon receipt of a communication request initiated by a network node, destination node information contained in the communication request, and to instruct, if a destination node indicated by the destination node information is judged to be a neighbor node of the network node according to neighbor node information contained in the wireless network resource management information, the network node to establish a Device to Device (D2D) connection with the destination node so as to perform communication directly.

In a case that the communication request initiated by the network node does not specify the destination node, the network programming unit 1704 may be configured to quickly find a network node serving as D2D interconnection object for the network node from the set of neighbor nodes of the network node according to the neighbor node information, and to instruct the network node to establish D2D connection with the found network node serving as the D2D interconnection object so as to perform communication.

In a case that the communication request initiated by the network node allows relay via other network nodes, the network programming unit 1704 may be configured to quickly find a network node which may serve as a relay node of the network node from a set of neighbor nodes of the network node according to neighbor node information. Further, the network programming unit 1704 may also instruct the network node to establish connection with the found network node which may serve as the relay node so as to perform communication.

Further, for a case of establishing Point-to-Multipoint (PMP) connection with any network node as a data transfer node, the network programming unit 1704 may be configured to check, upon receipt of communication requests initiated by a plurality of network nodes, destination node information contained in the communication requests, and to instruct, if all of destination nodes contained in the communication requests of the plurality of network nodes and the plurality network nodes are judged to be neighbor nodes of a certain network node according to neighbor node information contained in the wireless network resource management information, the certain network node to establish a Point-to-Multipoint (PMP) connection with the plurality of network nodes and the corresponding destination nodes so as to perform communication.

Further, preferably, if it is judged according to the connected network information contained in the wireless network resource management information that the destination node indicated by the destination node information contained in the communication request belong to the same connected network as the network node, it indicates that at least one wireless path constituted by one or more wireless links which enables the network node and the destination node to communicate with each other may be necessarily found within the connected network, then the network programming unit 1704 notifies the network node that it is able to communicate with the destination node.

It is to be understood that both the D2D connection and PMP connection as described above belong to the circumstance of single hop network, while for the circumstance of multiple hop network, that is, the circumstance of performing communication with a certain network node as a relay node, it also needs to perform routing selection, including judging whether there exists available route between the network node and the destination node and establishing a route for communication between the network node and the destination node.

Specifically, an unique identifier (ID) in the global network may be set for each connected network within the network signal coverage, and a field may be allocated for each network node to store the ID, and thus when judging whether there exists available route between two network nodes, it only needs to judge whether the IDs of the connected networks thereof are the same so as to quickly make judgment. If the IDs of the connected networks are the same, then it indicates that there exists available route, otherwise, it indicates there exists no available route.

There are various kinds of methods for establishing route among the network nodes in the connected network in the prior art, such as flooding algorithm and so on. However, in a case that the number of the network nodes is relatively great, utilization of such algorithm might have low efficiency. Therefore, preferably, the route can be selected by utilizing the sub-region information contained in the wireless network resource management information received from the network management apparatus, and thus it is possible to reduce amount of calculation, which facilitates quick establishment of the route.

Therefore, preferably, if it is judged that the network node and its destination node belong to the same connected network, the network programming unit 1704 may select, based on the sub-regions in which the network node and the destination node locate, a route for communication between the network node and the destination node according to the connected sub-region network information, and instruct the network node to communicate with the destination node via the selected route.

Specifically, the network programming unit 1704 may find, based on the sub-regions in which the network node and the destination node locate, a connected route between the sub-regions by utilizing the connected sub-region network information, and finally determine a relatively idea communication route between the network node and the destination node by combining the network status (such as overhead of establishing link, data traffic amount on the link and the like).

According to this embodiment, it is possible to achieve link selection and network establishment among the network nodes with high efficiency, thereby realizing quick dynamic network programming, and such effect is especially evident for the circumstance in which the network node has a high mobility.

Figure 18:
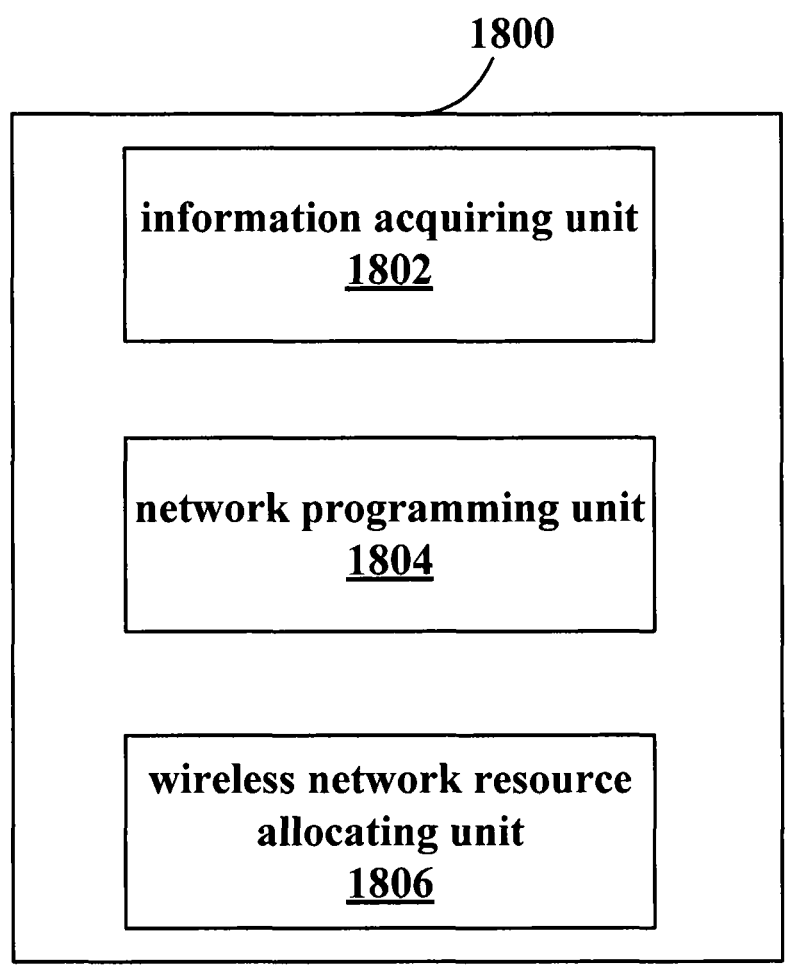
FIG. 18 is a block diagram illustrating an example of functional configuration of an apparatus in a wireless communication system according to another embodiment of the disclosure.

An example of functional configuration of an apparatus in a wireless communication system according to another embodiment of the disclosure will be described with reference to FIG. 18 below. FIG. 18 is a block diagram illustrating an example of functional configuration of an apparatus in a wireless communication system according to another embodiment of the disclosure.

As shown in FIG. 18, the apparatus 1800 may include an information acquiring unit 1802, a network programming unit 1804 and a wireless network resource allocating unit 1806. Particularly, the functional configurations of the information acquiring unit 1802 and the network programming unit 1804 are the same as those of the information acquiring unit 1702 and the network programming unit 1704 in the apparatus 1700 as described above with reference to FIG. 17, and no details thereof will be repeated herein. Only the example of the functional configuration of the wireless network resource allocating unit 1806 will be described below.

The wireless network resource allocating unit 1806 may be configured to allocate wireless network resources according to the acquired wireless network resource management information.

Preferably, the wireless network resource allocating unit 1806 may check, upon receipt of a communication request initiated by a network node, destination node information contained in the communication request, and to allocate, based on sub-regions in which a destination node indicated by the destination node information and the network node locate, the wireless network resources for communication between the network node and the destination node according to the wireless network resource management information.

It is to be understood that when allocating wireless network resources for communication between any two network nodes, in order to ensure communication quality, it is desired that respective communications will not interfere with each other. Since the wireless network resource management information provided by the network management apparatus described above includes a distribution map of available wireless network resources for each sub-region within the network signal coverage, by determining information about sub-regions in which any two network nodes being to communicate with each other locate, the wireless network resources for communication are allocated according to this information, and thus it is possible to avoid mutual interference, improving communication quality.

Figure 19:
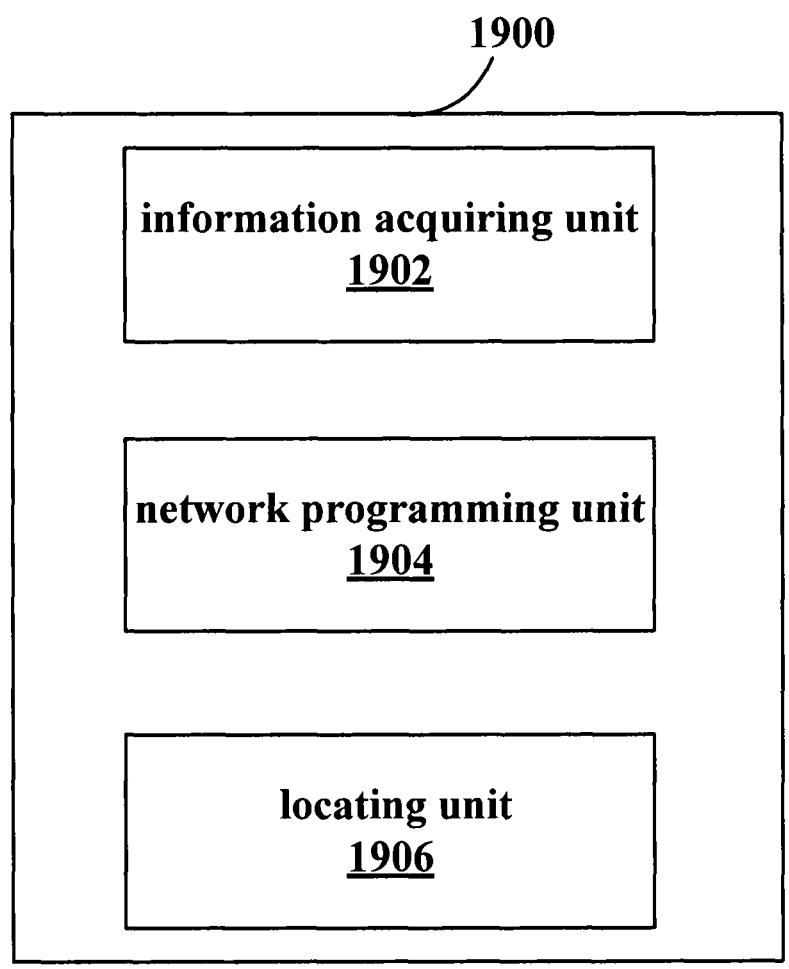
FIG. 19 is a block diagram illustrating an example of functional configuration of an apparatus in a wireless communication system according to yet another embodiment of the disclosure.

An example of functional configuration of an apparatus in a wireless communication system according to yet another embodiment of the disclosure will be described with reference to FIG. 19 below. FIG. 19 is a block diagram illustrating an example of functional configuration of an apparatus in a wireless communication system according to yet another embodiment of the disclosure.

As shown in FIG. 19, the apparatus 1900 may include an information acquiring unit 1902, a network programming unit 1904 and a locating unit 1906. Particularly, the functional configurations of the information acquiring unit 1902 and the network programming unit 1904 are the same as those of the information acquiring units 1702 and 1802 and the network programming units 1704 and 1804 as described above with reference to FIGS. 17 and 18 respectively, and thus no details thereof will be repeated herein. Only an example of the functional configuration of the locating unit 1906 will be described below.

The locating unit 1906 may be configured to acquire geographic position information of a network node. Specifically, in a case that a GPS module is mounted, the geographic position information of the network node can be obtained through GPS measurement, or if no GPS module is mounted, such information can also be obtained in a manner of network measurement (e.g., triangular measurement).

By providing the locating unit 1906 to obtain the geographic position information of the network node, it is possible to further simplify the functions and operations of the network node (e.g., user terminal equipment), which is especially important for a mobile device with limited battery capacity and a low power consumption device.

Further, it should note that in the above description, the position of the network management apparatus is not limited, and the network management apparatus may be located in the apparatuses 1700 to 1900 as the base station for example, or may be also located outside the apparatuses 1700 to 1900, for example, may be located in a coordinator common to a plurality of base stations. In a case that the network management apparatus is located in the base station, each network management apparatus is only responsible for maintaining management of network node distribution within the network signal coverage of the base station in which it locates; while in a case that the network management apparatus is located in the coordinator common to a plurality of base stations, the network management apparatus needs to be responsible for maintaining management of network node distribution within the total signal coverage of the plurality of base stations. Those skilled in the art may set the position of the network management apparatus according to requirements of actual applications, and the invention makes no limitation on this.

Figure 20:
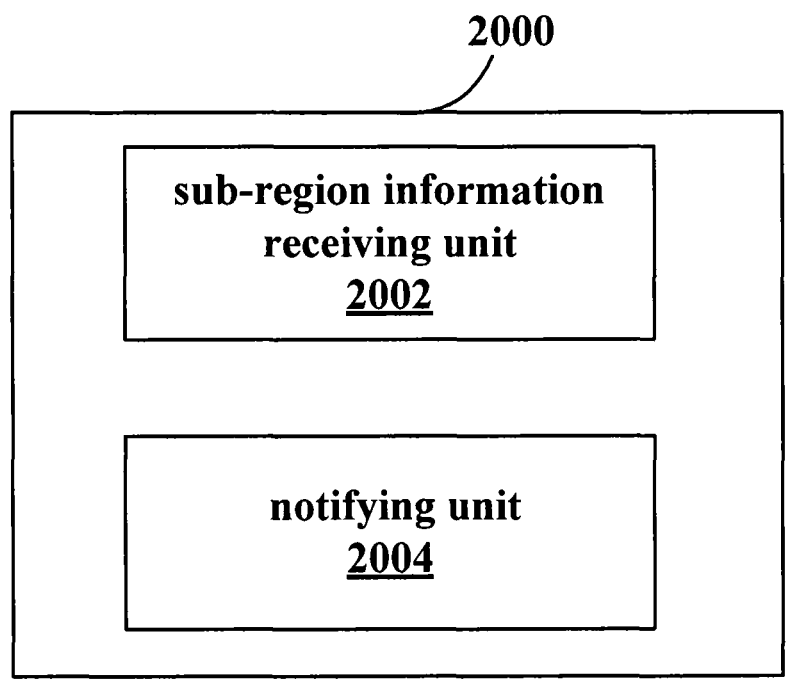
FIG. 20 is a block diagram illustrating an example of functional configuration of an apparatus in a wireless communication system according to an embodiment of the disclosure.

Next, an example of an apparatus in a wireless communication system according to an embodiment of the disclosure will be described with reference to FIG. 20 below. FIG. 20 is a block diagram illustrating an example of an apparatus in a wireless communication system according to an embodiment of the disclosure.

As shown in FIG. 20, the apparatus 2000 may include a sub-region information receiving unit 2002 and a notifying unit 2004. The apparatus 2000 may be user side device for example personal computer (PC), personal digital assistance (PDA), mobile phone, tab computer and the like, that is, the above described network node.

The sub-region information receiving unit 2002 may be configured to receive information about a sub-region in which the apparatus 2000 locates from the foregoing network management apparatus.

The notifying unit 2004 may be configured to notify the network management apparatus when the apparatus 2000 is judged to be leaving or have left the sub-region in which it originally locates according to geographic position information of the apparatus 2000.

Specifically, for some user side devices with low mobility, if the network management apparatus frequently checks the geographic position information of these user side devices to judge the variation in the current network node distribution, it may result in a waste of network resources. Therefore, the user side device periodically reports its current geographic position information to the network management apparatus via its notifying unit so that the network management apparatus checks the current condition of the network node distribution, and only when the network node distribution is changing or has changed (that is, the sub-regions in which the network nodes locate are changing or have changed), the network side device (for example, the apparatuses 1700 to 1900) is triggered to perform network structure adjustment and wireless network resource allocation, thereby enabling reduction in network overhead to some extent.

Further, preferably, the user side device itself may also judge whether it is leaving or has left the sub-region in which it originally locates. Specifically, the user side device judges whether it has remained in the original sub-region according to the information about the sub-region in which it locates (including the position and size of the sub-region or the like) received from the network management apparatus and by combining the current geographic position information, and if it judges the user side device is leaving or has left the original sub-region, it notifies the network management apparatus via the notifying unit, and at this time, the network management apparatus re-determines the current condition of the network node distribution, and triggers the network side device to perform network structure adjustment and wireless network resource allocation according to the current condition of the network node distribution. In this manner, it is possible to further reduce waste of the network resources.

Figure 21:
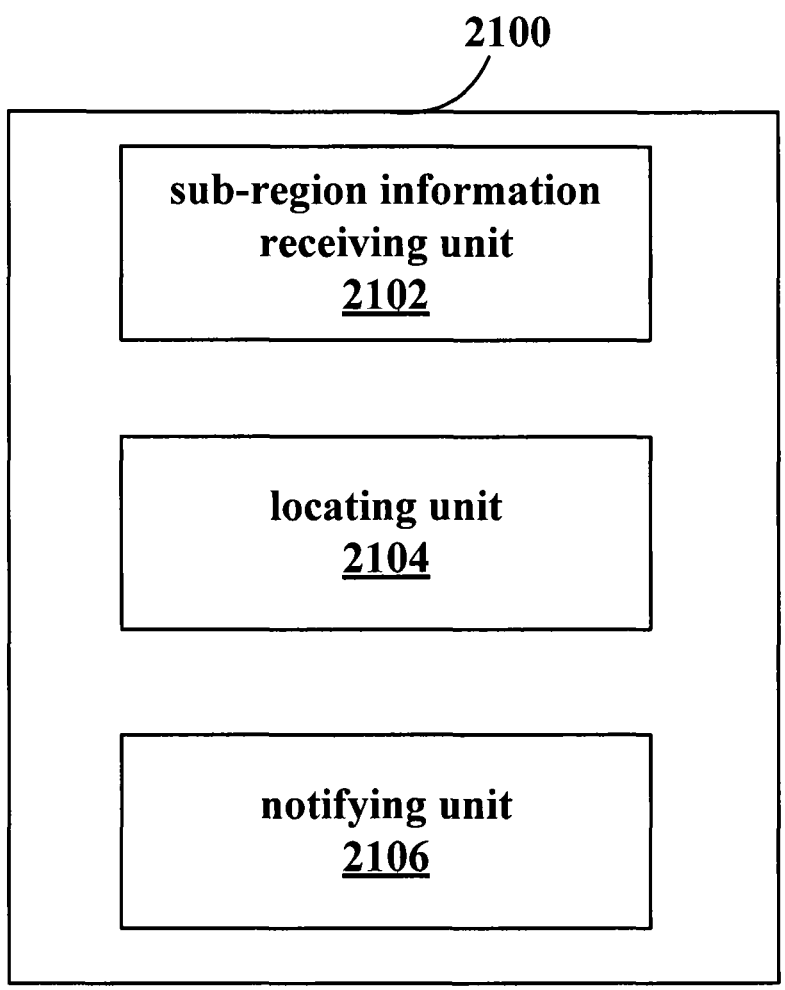
FIG. 21 is a block diagram illustrating an example of functional configuration of an apparatus in a wireless communication system according to another embodiment of the disclosure.

An example of functional configuration of an apparatus in a wireless communication system according to another embodiment of the disclosure will be described with reference to FIG. 21 below. FIG. 21 is a block diagram illustrating an example of functional configuration of an apparatus in a wireless communication system according to another embodiment of the disclosure.

As shown in FIG. 21, the apparatus 2100 may include a sub-region information receiving unit 2102, a locating unit 2104 and a notifying unit 2106. Particularly, the functional configuration of the sub-region information receiving unit 2102 is the same as that of the sub-region information receiving unit 2002 in the apparatus 2000 as described above with reference to FIG. 20, and no details thereof will be repeated herein. Only examples of the functional configurations of the locating unit 2104 and the notifying unit 2106 will be described below.

The locating unit 2104 may be configured to measure the geographic position information of the apparatus 2100. As described above, the geographic position information of the apparatus 2100 may be obtained through GPS measurement utilizing the GPS module or network measurement (e.g., triangular measurement).

The notifying unit 2106 may be configured to notify the geographic position information of the apparatus 2100 to the network management apparatus, and notifies the network management apparatus when it judges according to the geographic position information of the apparatus 2100 that the apparatus 2100 is leaving or has left the original sub-region.

Figure 22:
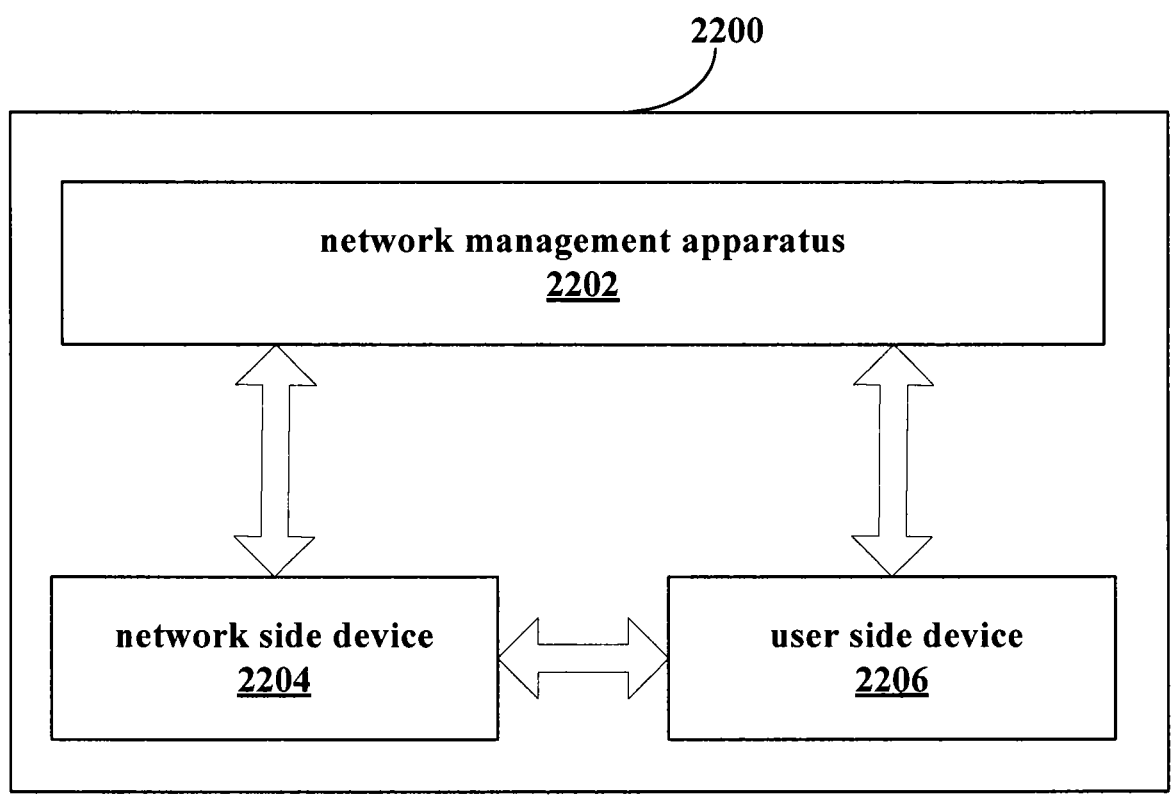
FIG. 22 is a schematic diagram illustrating an example of architecture of a wireless communication system according to an embodiment of the disclosure.

An example of architecture of a wireless communication system according to an embodiment of the disclosure will be described with reference to FIG. 22 below. FIG. 22 is a schematic diagram illustrating an example of architecture of a wireless communication system according to an embodiment of the disclosure.

As shown in FIG. 22, the wireless communication system 2200 includes a network management apparatus 2202, a network side device 2204 and user side device 2206. Particularly, the network management apparatus 2202 is for example the network management apparatus as described above with reference to FIGS. 1-10, the network side device 2204 is for example the apparatus in the wireless communication system as described above with reference to FIGS. 17-19, and the user side device 2206 is for example the apparatus in the wireless communication system as described above with reference to FIGS. 20-21, and thus no details thereof will be repeated herein.

It is to be understood that the architecture as shown in FIG. 22 is only a schematic diagram given for the purpose of clarity, and the actual architecture of the wireless communication system is much more complex.

As can be seen, according to the embodiments of the disclosure, both quick dynamic network programming and reasonable resource allocation among the network nodes can be realized, thereby better adapting to the current status of the complex and flexible heterogeneous network.

Further, the embodiment of the disclosure further provides a storage medium including machine readable program codes, which when executed on an information processing device, cause the information processing device to perform the method for use in the wireless communication system according to the embodiments of the disclosure as described above.

Further, the embodiment of the disclosure further provides a program product including machine executable instructions, which when executed on an information processing device, cause the information processing device to perform the method for use in the wireless communication system according to the embodiments of the disclosure as described above.

Accordingly, a storage medium on which the above program product storing machine readable instruction codes is carried is also included in the disclosure of the invention. The storage medium includes but not limited to a floppy disk, an optical disk, a magneto-optical disk, a storage card, a memory rod and the like.

Furthermore, it shall be noted that the foregoing series of processes and apparatuses can also be embodied in software and/or firmware. In the case of being embodied in software and/or firmware, a program constituting the software is installed from a storage medium or a network to a computer with a dedicated hardware structure, e.g., a general purpose personal computer 2300 illustrated in FIG. 23, which can perform various functions when various programs are installed thereon.

Figure 23:
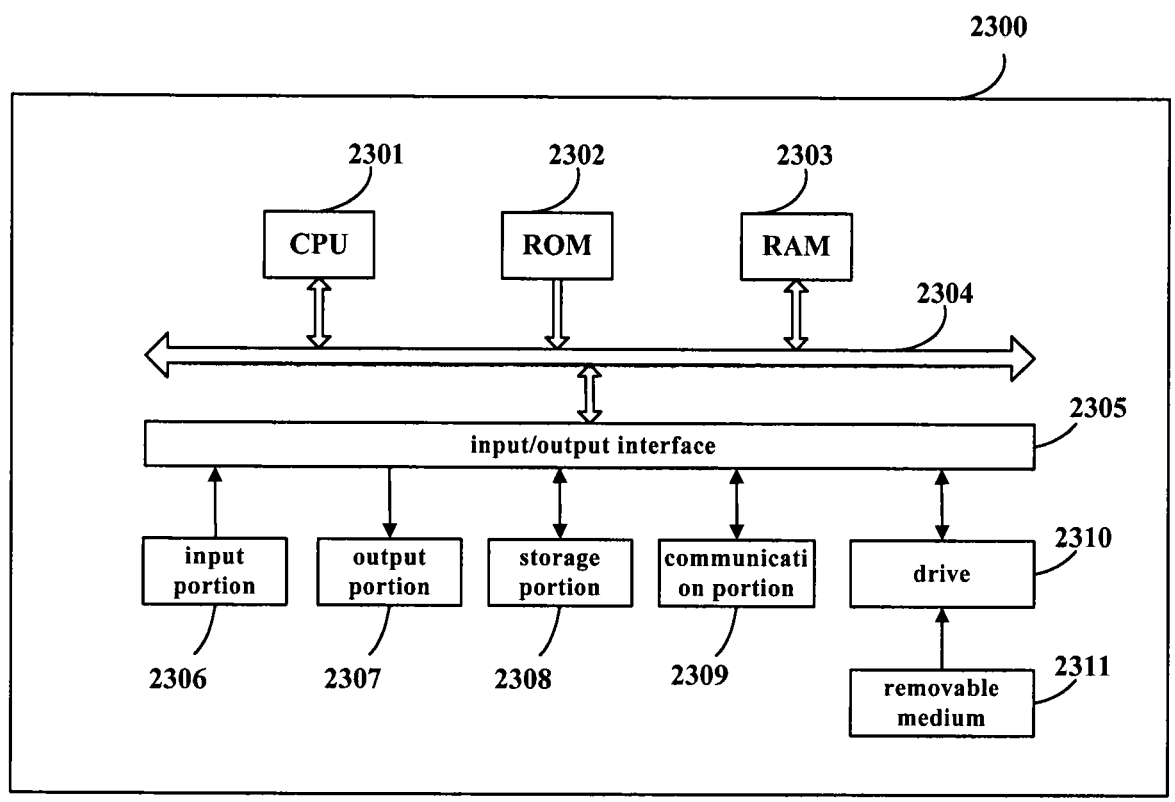
FIG. 23 is a block diagram illustrating an exemplary structure of a personal computer as an information processing device that may be used in an embodiment of the disclosure.

In FIG. 23, a Central Processing Unit (CPU) 2301 performs various processes according to a program stored in a Read Only Memory (ROM) 2302 or loaded from a storage portion 2308 into a Random Access Memory (RAM) 2303 in which data required when the CPU 2301 performs the various processes is also stored as needed.

The CPU 2301, the ROM 2302 and the RAM 2303 are connected to each other via a bus 2304 to which an input/output interface 2305 is also connected.

The following components are connected to the input/output interface 2305: an input portion 2306 including a keyboard, a mouse, etc.; an output portion 2307 including a display, e.g., a Cathode Ray Tube (CRT), a Liquid Crystal Display (LCD), etc., a speaker, etc.; a storage portion 2308 including a hard disk, etc.; and a communication portion 2309 including a network interface card, e.g., an LAN card, a modem, etc. The communication portion 2309 performs a communication process over a network, e.g., the Internet.

A drive 2310 is also connected to the input/output interface 2305 as needed. A removable medium 2311, e.g., a magnetic disk, an optical disk, an magneto optical disk, a semiconductor memory, etc., can be installed on the drive 2310 as needed so that a computer program fetched therefrom can be installed into the storage portion 2308 as needed.

In the case that the foregoing series of processes are performed in software, a program constituting the software is installed from a network, e.g., the Internet, etc., or a storage medium, e.g., the removable medium 2311, etc.

Those skilled in the art shall appreciate that such a storage medium will not be limited to the removable medium 2311 illustrated in FIG. 23 in which the program is stored and which is distributed separately from the device to provide a user with the program. Examples of the removable medium 2311 include a magnetic disk (including a Floppy Disk (a registered trademark)), an optical disk (including Compact Disk-Read Only memory (CD-ROM) and a Digital Versatile Disk (DVD)), a magneto optical disk (including a Mini Disk (MD) (a registered trademark)) and a semiconductor memory. Alternatively, the storage medium can be the ROM 2302, a hard disk included in the storage portion 2308, etc., in which the program is stored and which is distributed together with the device including the same to the user.

It shall further be noted that the steps of the foregoing series of processes may naturally but not necessarily be performed in the sequential order as described chronically. Some of the steps may be performed concurrently or separately from each other.

Although the technique and the advantages thereof have been described in details, it shall be appreciated that various modifications, substitutions and variations can be made without departing from the spirit and scope of the technique as defined by the appended claims. Furthermore the terms "include", "comprise" or any variants thereof in the embodiments of the technique are intended to encompass nonexclusive inclusion so that a process, method, article or apparatus including a series of elements includes both those elements and one or more other elements which are listed explicitly or an element(s) inherent to the process, method, article or apparatus. Without much more limitation, an element being defined by a sentence "include/comprise a(n) . . . " will not exclude presence of an additional identical element(s) in the process, method, article or apparatus including the element.

The invention claimed is:

1. A network management apparatus in a wireless communication system, the network management apparatus comprising:
   circuitry configured to:
   divide a region representing a network signal coverage of a base station at the center of the region into a plurality of sub-regions according to transmission characteristics of a network node such that a diameter of each sub-region does not exceed a minimum signal transmission radius between the network node and a neighbor node, and a radius of each sub-region is no smaller than a maximum signal transmission radius of the network node;
   determine a sub-region of the plurality of sub-regions in which the network node is located within the network signal coverage according to the geographic position information of the network node;
   construct wireless network resource management information according to the sub-region in which the network node is located, including configuring a connected sub-region network within the network signal coverage, wherein the connected sub-region network comprises the neighbor node capable of directly communicating with the network node.

2. The network management apparatus according to claim 1 wherein the circuitry is further configured to manage a connected network formed by each network node and its neighbor node, wherein any two network nodes within the connected network are able to communicate with each other via at least one wireless path constituted by one or more wireless links.

3. The network management apparatus according to claim 2, wherein the circuitry is further configured to manage a connected sub-region network which is formed by sub-regions in which each of the network nodes within the connected network locates and which corresponds to the connected network.

4. The network management apparatus according to claim 3, wherein the circuitry is further configured to:
   establish the connected network and the connected sub-region network according to the determined neighbor node; and
   update the established connected network and connected sub-region network according to status and/or motion feature of the network node.

5. The network management apparatus according to claim 4, wherein the circuitry is further configured to:
   establish, for any target network node, the connected network formed by all of relevant network nodes related to the target network node and the target network node based on the relevant network nodes, wherein the relevant network nodes comprise a neighbor node of the target network node and a network node which is able to communicate with the target network node via the neighbor node; and
   establish the connected sub-region network corresponding to the connected network according to a sub-region in which the target network node locates and sub-regions in which the relevant network nodes locate.

6. The network management apparatus according to claim 4, wherein the circuitry is further configured to update, when the status and/or motion feature of the network node changes, the established connected network and connected sub-region network according to variations in the connected network and the connected sub-region network in which the network node is involved.

7. The network management apparatus according to claim 1, wherein the circuitry is further configured to estimate an interference range of wireless network resources used in communication between each network node and its neighbor node and manage wireless network resources available to each network node according to the estimated interference range.

8. The network management apparatus according to claim 7, wherein the circuitry is further configured to manage wireless network resources available to the sub-region in which each network node locates according to the estimated interference range.

9. The network management apparatus according to claim 8, wherein the circuitry is further configured to re-determine the interference range when status and/or motion feature of the network node changes, and to update the distribution map of available wireless network resources according to the re-determined interference range.

10. The network management apparatus according to claim 1, wherein the circuitry is further configured to determine a size of the sub-region according to an object of network region division.

11. The network management apparatus according to claim 1, wherein the circuitry is further configured to:
estimate a motion feature of the network node in a unit of sub-region, and
construct the wireless network resource management information based on the motion feature.

12. The network management apparatus according to claim 11, wherein the circuitry is further configured to determine a series of sub-regions that the network node passes through within a predetermined time period and a time during which the network node resides in each sub-region according to the motion feature of the network node, thereby obtaining a locating result of the network node.

13. The network management apparatus according to claim 12, wherein the circuitry is further configured to group the network node according to the locating result and the motion feature of the network node and construct the wireless network resource management information according to the grouped network node.

14. A method for use in a wireless communication system, the method comprising:
dividing a region representing a network signal coverage of a base station at the center of the region into a plurality of sub-regions according to transmission characteristics of a network node such that a diameter of each sub-region does not exceed a minimum signal transmission radius between the network node and a neighbor node, and a radius of each sub-region is no smaller than a maximum signal transmission radius of the network node;
determining a sub-region of the plurality of sub-regions in which the network node is located within the network signal coverage according to the geographic position information of the network node;
constructing wireless network resource management information according to the sub-region in which the network node is located, including configuring a connected sub-region network within the network signal coverage, wherein the connected sub-region network comprises the neighbor node capable of directly communicating with the network node.

15. The method according to claim 14, wherein constructing the wireless network resource management information further comprises:
managing a connected network formed by each network node and its neighbor node, wherein any two network nodes within the connected network are able to communicate with each other via at least one wireless path constituted by one or more wireless links.

16. The method according to claim 15, wherein managing the connected network further comprising forming a connected sub-region network by sub-regions in which each of the network nodes within the connected network locates and which corresponds to the connected network is managed.

17. The method according to claim 14, wherein constructing the wireless network resource management information further comprises:
estimating an interference range of wireless network resources used in communication between each network node and its neighbor node and managing wireless network resources available to each network node according to the estimated interference range.

18. An apparatus in a wireless communication system, the apparatus comprising:
circuitry configured to:
acquire wireless network resource management information provided by the network management apparatus according to claim 1; and
perform network programming according to the wireless network resource management information.

19. The apparatus according to claim 18, wherein the circuitry is further configured to allocate wireless network resources according to the wireless network resource management information provided by the network management apparatus.

20. The apparatus according to claim 18, wherein the circuitry is further configured to acquire geographic position information of a network node.

21. The apparatus according to claim 18, wherein the circuitry is further configured to check, upon receipt of a communication request initiated by a network node, destination node information contained in the communication request, and to instruct, when a destination node indicated by the destination node information is judged to be a neighbor node of the network node according to neighbor node information contained in the wireless network resource management information, the network node to establish a Device to Device connection with the destination node so as to perform communication.

22. The apparatus according to claim 18, wherein the circuitry is further configured to check, upon receipt of a communication request initiated by a network node, whether the communication request allows relay via other network nodes, and to find, when the relay via other network nodes is allowed, a network node serving as a relay node of the network node from a set of neighbor nodes of the network node according to neighbor node information contained in the wireless network resource management information, and to instruct the network node to establish connection with the found network node as the relay node so as to perform communication.

23. The apparatus according to claim 18, wherein the circuitry is further configured to check, upon receipt of communication requests initiated by a plurality of network nodes, destination node information contained in the communication requests, and to instruct, when all of destination nodes contained in the communication requests of the plurality of network nodes and the plurality network nodes are judged to be neighbor nodes of a certain network node according to neighbor node information contained in the wireless network resource management information, the certain network node to establish a Point-to-Multipoint connection with the plurality of network nodes and corresponding destination nodes so as to perform communication.

24. The apparatus according to claim 18, wherein the circuitry is further configured to check, upon receipt of a communication request initiated by a network node, destination node information contained in the communication request, and to notify, when a destination node indicated by the destination node information and the network node are judged to belong to the same connected network according to connected network information contained in the wireless network resource management information, the network node of being able to communicate with the destination node.

25. The apparatus according to claim 24, wherein when the destination node and the network node belong to the same connected network, the circuitry is further configured to select, based on sub-regions in which the destination node and the network node locate, a route for communication between the destination node and the network node according to connected sub-region network information contained in the wireless network resource management information, and to instruct the network node to communicate with the destination node via the selected route.

26. The apparatus according to claim 19, wherein the circuitry is further configured to check, upon receipt of a communication request initiated by a network node, destination node information contained in the communication request, and to allocate, based on sub-regions in which a destination node indicated by the destination node information and the network node locate, the wireless network resources for communication between the network node and the destination node according to the wireless network resource management information.

27. An apparatus in a wireless communication system, the apparatus comprising:
circuitry configured to:
receive information about a sub-region in which the apparatus locates from the network management apparatus according to claim 1; and
notify the network management apparatus when the apparatus is judged to be leaving or have left the sub-region according to geographic position information of the apparatus.

28. The apparatus according to claim 27, wherein the circuitry is further configured to:
measure the geographic position information, and
notify the network management apparatus of the geographic position information.

29. The network management apparatus according to claim 1 wherein the circuitry is further configured to:
establish a map of available wireless network resources used for direct communication for the sub-regions according to the wireless network resources available to each sub-region; and
receive periodic geographic position information of the network node from the network node,
wherein the circuitry is configured to construct the wireless network resource management information in order for the network node to directly communicate with a neighbor node based on the map of available wireless resources.

30. The method according to claim 14, further comprising:
establishing a map of available wireless network resources used for direct communication for the sub-regions according to the wireless network resources available to each sub-region; and
receiving periodic geographic position information of the network node from the network node,
wherein the constructing is performed in order for the network node to directly communicate with a neighbor node based on the map of available wireless resources.

31. The network management apparatus according to claim 1, wherein the circuitry is further configured to divide the region into a plurality of sub-regions by determining a size of the plurality of sub-regions, such that at most one network node is included within each sub-region.

* * * * *